United States Patent
Wenzel et al.

(10) Patent No.: US 10,264,919 B2
(45) Date of Patent: Apr. 23, 2019

(54) FOOD SUPPORT GRATE

(71) Applicant: Hestan Commercial Corporation, Anaheim, CA (US)

(72) Inventors: Hans F Wenzel, Santa Ana, CA (US); Chris Moy, Monterey Park, CA (US)

(73) Assignee: Hestran Commercial Corporation, Anaheim, CA (US)

( * ) Notice: Subject to any disclaimer, the term of this patent is extended or adjusted under 35 U.S.C. 154(b) by 405 days.

(21) Appl. No.: 14/993,208

(22) Filed: Jan. 12, 2016

(65) Prior Publication Data

US 2016/0198897 A1 Jul. 14, 2016

Related U.S. Application Data

(60) Provisional application No. 62/102,237, filed on Jan. 12, 2015.

(51) Int. Cl.
*A47J 37/06* (2006.01)
*A47J 37/07* (2006.01)

(52) U.S. Cl.
CPC ........... *A47J 37/06* (2013.01); *A47J 37/0704* (2013.01); *A47J 37/0786* (2013.01)

(58) Field of Classification Search
CPC ...... A47J 37/06; A47J 37/0704; A47J 37/067; A47J 37/0694; A47J 37/0786; F23H 17/00; F23H 2700/004; F23H 7/00
USPC ... 126/25 R, 152 R, 126, 152 B, 152 A, 168, 126/176 A, 180, 541, 400, 273.5, 9 R, 126/9 B, 29, 153; 99/385, 448, 445
See application file for complete search history.

(56) References Cited

U.S. PATENT DOCUMENTS

| | | | | |
|---|---|---|---|---|
| 1,057,449 | A * | 4/1913 | Noreck | A47J 37/0704 126/41 D |
| 1,233,795 | A * | 7/1917 | Krebs | F24C 3/085 126/39 E |
| 1,510,547 | A * | 10/1924 | Ferrari | A47J 37/067 126/214 C |
| 2,060,004 | A * | 11/1936 | Ebberts | A47J 37/067 99/446 |
| D188,501 | S * | 8/1960 | Wood | D7/359 |
| 3,186,331 | A * | 6/1965 | Dettling | A47J 37/067 99/445 |
| 3,199,438 | A * | 8/1965 | Myler | A47J 37/041 248/175 |
| 3,369,481 | A * | 2/1968 | Miller | A47J 37/0682 99/445 |

(Continued)

*Primary Examiner* — Jimmy Chou
(74) *Attorney, Agent, or Firm* — Akerman LLP

(57) ABSTRACT

According to one embodiment, a food support grate includes a plurality of slats. Each of the slats has an upper cooking surface having an upper apex; a lower cooking surface having a lower apex; a rear side; and a front side. The food support grate further includes a plurality of bridges that each couple two or more adjacent slats to each other. The upper apexes define an upper plane and the lower apexes define a lower plane. The rear sides and the front sides each have a portion positioned at an oblique angle with respect to one of the upper and lower planes. The upper apex of each of the slats has a first radius of curvature, and the lower apex of each of the slats has a second radius of curvature. The first radius of curvature is smaller than the second radius of curvature.

22 Claims, 9 Drawing Sheets

(56) References Cited

U.S. PATENT DOCUMENTS

| | | | | |
|---|---|---|---|---|
| 3,623,422 A | * | 11/1971 | Marshall | A47J 37/0676 99/340 |
| 4,403,541 A | * | 9/1983 | Berger | A47J 37/067 29/433 |
| 4,606,261 A | * | 8/1986 | Bernardi | A47J 37/067 99/445 |
| RE32,288 E | * | 11/1986 | Berger | A47J 37/067 29/897.15 |
| 4,784,109 A | * | 11/1988 | Korpan | A47J 37/067 126/25 R |
| 4,930,491 A | * | 6/1990 | Purello | A47J 37/067 126/25 R |
| D312,125 S | * | 11/1990 | Epner | D23/386 |
| 5,009,151 A | * | 4/1991 | Hungerford | A47J 37/0786 126/25 R |
| 5,076,154 A | * | 12/1991 | Bagwell | A47J 37/0682 99/444 |
| 5,105,725 A | * | 4/1992 | Haglund | A47J 37/0704 126/25 R |
| 5,172,682 A | * | 12/1992 | Luebke | A21B 1/245 126/21 A |
| D340,835 S | * | 11/1993 | Lupa | D7/402 |
| 5,259,299 A | * | 11/1993 | Ferraro | A47J 37/0713 99/340 |
| 5,347,978 A | * | 9/1994 | Zuran | A47J 37/067 126/25 R |
| 5,368,009 A | * | 11/1994 | Jones | A47J 37/0682 126/39 K |
| 5,437,221 A | * | 8/1995 | Schwod | A47J 37/067 126/41 R |
| D363,410 S | * | 10/1995 | Hazen | D7/359 |
| 5,467,691 A | * | 11/1995 | Koziol | A47J 37/0694 99/340 |
| D364,995 S | * | 12/1995 | Koziol | D7/409 |
| 5,528,992 A | * | 6/1996 | Cole | F23G 5/444 104/134 |
| 5,572,924 A | * | 11/1996 | Crnjanski | A47J 37/0694 99/426 |
| 5,785,046 A | * | 7/1998 | Colla | F24B 1/202 126/9 R |
| 5,931,085 A | * | 8/1999 | Benzschawel | A47J 37/0763 126/25 A |
| 5,974,954 A | * | 11/1999 | Rigney | A47J 37/0786 99/396 |
| 6,024,081 A | * | 2/2000 | Libertini, Jr. | A47J 37/0694 126/14 |
| D443,795 S | * | 6/2001 | Rimback | D7/402 |
| 6,260,478 B1 | * | 7/2001 | Harneit | A47J 37/067 99/400 |
| D446,683 S | * | 8/2001 | Pai | D7/402 |
| 6,481,343 B1 | * | 11/2002 | Rigney | A47J 37/067 99/396 |
| 7,373,875 B2 | * | 5/2008 | Bruno | A47J 37/0682 126/41 R |
| 7,506,579 B2 | * | 3/2009 | Worton | A47J 37/0694 99/445 |
| 7,707,929 B1 | * | 5/2010 | Bourgeois | A47J 43/18 99/340 |
| 7,810,484 B2 | * | 10/2010 | Schlosser | A47J 37/0713 126/25 R |
| 7,810,487 B2 | * | 10/2010 | Johnston | A47J 37/0694 126/152 A |
| 8,037,879 B2 | * | 10/2011 | Murrin | A47J 37/0694 126/25 R |
| D655,803 S | * | 3/2012 | Platt | D23/365 |
| 8,151,699 B2 | * | 4/2012 | Coutts | A47J 37/0682 126/49 |
| D691,400 S | * | 10/2013 | Young | D6/596 |
| 8,584,580 B2 | * | 11/2013 | Barrett | A47J 37/067 126/152 R |
| 8,720,324 B2 | * | 5/2014 | Coutts | A47J 37/067 99/400 |
| 8,813,637 B2 | * | 8/2014 | Worton | A47J 37/0694 99/445 |
| 8,813,738 B2 | * | 8/2014 | Ahmed | A47J 37/0694 126/25 R |
| D722,821 S | * | 2/2015 | Liu | D7/409 |
| 9,049,955 B2 | * | 6/2015 | Coutts | A47J 37/0682 |
| 9,814,352 B2 | * | 11/2017 | Ahmed | A47J 37/067 |
| 9,845,951 B2 | * | 12/2017 | Bachmann | F23H 3/02 |
| 2003/0140799 A1 | * | 7/2003 | Witzel | A47J 37/067 99/447 |
| 2003/0177913 A1 | * | 9/2003 | Dellinger | A47J 37/0713 99/339 |
| 2004/0094142 A1 | * | 5/2004 | Christensen | A47J 37/067 126/41 R |
| 2006/0054029 A1 | * | 3/2006 | Lauro | A47J 37/0694 99/445 |
| 2007/0125357 A1 | * | 6/2007 | Johnston | A47J 37/0694 126/41 R |
| 2009/0090348 A1 | * | 4/2009 | Contarino, Jr. | A47J 37/074 126/25 R |
| 2009/0173332 A1 | * | 7/2009 | Lott | A47J 37/067 126/153 |
| 2009/0196970 A1 | * | 8/2009 | Barrett | A47J 37/067 426/523 |
| 2009/0308374 A1 | * | 12/2009 | Ahmed | A47J 37/067 126/25 R |
| 2010/0294138 A1 | * | 11/2010 | Bryce | A47J 37/067 99/450 |
| 2011/0180527 A1 | * | 7/2011 | Abbott | A47J 27/002 219/450.1 |
| 2011/0252977 A1 | * | 10/2011 | Sacherman | A47J 27/002 99/401 |
| 2012/0222665 A1 | * | 9/2012 | Ahmed | A47J 37/0694 126/25 R |
| 2012/0304980 A1 | * | 12/2012 | Dettloff | F23D 14/125 126/39 E |
| 2012/0318149 A1 | * | 12/2012 | Ahmed | A47J 37/0682 99/445 |
| 2013/0146044 A1 | * | 6/2013 | Ahmed | A47J 37/0786 126/153 |
| 2014/0208962 A1 | * | 7/2014 | Poon | A47J 37/0763 99/445 |
| 2015/0114238 A1 | * | 4/2015 | Palermo | A47J 37/0623 99/401 |
| 2015/0238049 A1 | * | 8/2015 | Jones | A47J 37/0704 126/25 R |
| 2015/0342402 A1 | * | 12/2015 | Bombard | A47J 37/0694 99/448 |

* cited by examiner

FOOD SUPPORT GRATE

CROSS-REFERENCE TO RELATED APPLICATIONS

This application claims the benefit of priority to U.S. Provisional Patent Application No. 62/102,237, filed Jan. 12, 2015, the entirety of which is incorporated herein.

TECHNICAL FIELD

This disclosure relates generally to the field of cooking and more specifically to a food support grate.

BACKGROUND

Traditionally, a cooking unit (such as a range) may have a grate or grill that may hold food as the cooking unit is cooking the food. These traditional grates (and/or grills) may be made of grate members that have spacing in-between adjacent grate members. This spacing in-between adjacent grate members may allow heat to be directed from a heat source in the cooking unit to the food supported by the grate. Such traditional grates (and/or grills), however, may be deficient.

SUMMARY

A first aspect of the invention is achieved by providing a food support grate, comprising a plurality of slats positioned parallel and in a spaced-apart relation to each other, each of the plurality of slats having an upper cooking surface having an upper apex with a first radius of curvature; a lower cooking surface having a lower apex with a second radius of curvature, wherein the first radius of curvature is smaller than the second radius of curvature; a rear side that extends from the upper cooking surface to the lower cooking surface; and a front side; a plurality of bridges that each couple two or more adjacent slats of the plurality of slats to each other; wherein the upper apexes of the plurality of slats define an upper plane and the lower apexes of the plurality of slats define a lower plane; wherein the rear sides and the front sides of the plurality of slats each have a portion positioned at an oblique angle with respect to one of the upper and lower planes; wherein the lower cooking surface of each of the plurality of slats has a convex shape on a bottom portion of the lower cooking surface, and further has a concave shape on a top portion of the lower cooking surface, wherein each of the concave shapes on the top portions of the lower cooking surfaces of the plurality of slats define a channel along the length of the respective slat of the plurality of slats; and wherein the food support grate is configured to be positioned in a cooking unit with the upper cooking surfaces facing upward, and further configured to be positioned in the cooking unit with the lower cooking surfaces facing upward and the upper cooking surfaces facing downward.

A second aspect of the invention is achieved by providing a food support grate, comprising a plurality of slats positioned parallel and in a spaced-apart relation to each other, each of the plurality of slats having an upper cooking surface having an upper apex; a lower cooking surface having a lower apex; a rear side that extends from the upper cooking surface to the lower cooking surface; and a front side opposite the rear side; a plurality of bridges that each couple two or more adjacent slats of the plurality of slats to each other; wherein the upper apexes of the plurality of slats define an upper plane and the lower apexes of the plurality of slats define a lower plane; wherein the rear sides and the front sides of the plurality of slats each have a portion positioned at an oblique angle with respect to one of the upper and lower planes; and wherein the upper apex of each of the plurality of slats has a first radius of curvature, and the lower apex of each of the plurality of slats has a second radius of curvature, wherein the first radius of curvature is smaller than the second radius of curvature.

Another aspect of the invention is any such food support grate, wherein the lower cooking surface of each of at least a portion of the plurality of slats has a convex shape on a bottom portion of the lower cooking surface, and further has a concave shape on a top portion of the lower cooking surface, and further wherein each of the concave shapes on the top portions of the lower cooking surfaces of the at least the portion of the plurality of slats define a channel along a length of the respective slat of the at least the portion of the plurality of slats.

Another aspect of the invention is any such food support grate, wherein the channel is configured to collect fluid draining down the front side of the respective slat.

Another aspect of the invention is any such food support grate, wherein the at least the portion of the plurality of slats comprises all of the plurality of slats.

Another aspect of the invention is any such food support grate, wherein each of the plurality of slats is spaced apart from a respective adjacent slat so that the channel of the respective adjacent slat is disposed to receive fluid dripping downward from the upper cooking surface of the each of the plurality of slats.

Another aspect of the invention is any such food support grate, wherein the front sides of the plurality of slats are each positioned at a slope having a slope width, and wherein the channels of the at least the portion of the plurality of slats each have a channel width having a size of 50%-200% of a size of a respective slope width.

Another aspect of the invention is any such food support grate, wherein the upper cooking surface of each of at least a second portion of the plurality of slats has a width that is smaller than a width of the respective lower cooking surface.

Another aspect of the invention is any such food support grate, wherein the upper plane is parallel to the lower plane.

Another aspect of the invention is any such food support grate, wherein the food support grate is configured to be positioned in a cooking unit with the upper cooking surfaces facing upward.

Another aspect of the invention is any such food support grate, wherein the food support grate is further configured to be positioned in the cooking unit with the lower cooking surfaces facing upward and the upper cooking surfaces facing downward.

Another aspect of the invention is any such food support grate, wherein the plurality of slats are each shaped as a "J".

A third aspect of the invention is achieved by providing a food support grate, comprising a plurality of slats positioned parallel and in a spaced-apart relation to each other, each of the plurality of slats having an upper cooking surface having an upper apex; a lower cooking surface having a lower apex; a rear side that extends from the upper cooking surface to the lower cooking surface; and a front side; a plurality of bridges that each couple two or more adjacent slats of the plurality of slats to each other, each bridge having an upper bridge surface and a lower bridge surface; wherein the upper apexes of the plurality of slats define an upper plane and the lower apexes of the plurality of slats define a lower plane; wherein the upper bridge surfaces and lower bridge surfaces of the plurality of bridges are positioned within the upper plane and the lower plane; wherein the upper cooking surface of each of at least a portion of the plurality of slats has a width that is smaller than a width of the respective lower cooking surface; and wherein the rear sides and the front sides of the plurality of slats each have a portion positioned at an oblique angle with respect to one of the upper and lower planes.

Another aspect of the invention is any such food support grate, wherein the at least the portion of the plurality of slats comprises all of the plurality of slats.

A fourth aspect of the invention is achieved by providing a food support grate, comprising a plurality of slats positioned in a spaced-apart relation to each other, each of the plurality of slats having an upper cooking surface having an upper apex; a lower cooking surface having a lower apex; a rear side that extends from the upper cooking surface to the lower cooking surface; and a front side; a plurality of bridges that each couple two or more adjacent slats of the plurality of slats to each other; wherein the upper apexes of the plurality of slats define an upper plane and the lower apexes of the plurality of slats define a lower plane; wherein the rear sides and the front sides of the plurality of slats each have a portion positioned at an oblique angle with respect to one of the upper and lower planes; and wherein the lower cooking surface of each of at least a portion of the plurality of slats includes a channel along a length of the respective slat of the at least the portion of the plurality of slats, the channel being configured to collect fluid draining down the front side of the respective slat.

Another aspect of the invention is any such food support grate, wherein the rear sides and the front sides of the plurality of slats each have a portion positioned at an oblique angle with respect to one of the upper and lower planes.

Another aspect of the invention is any such food support grate, wherein the oblique angle of a first slat of the plurality of slats is different than the oblique angle of a second slat of the plurality of slats.

Another aspect of the invention is any such food support grate, wherein the front sides of the plurality of slats are each positioned at a slope having a slope width, and wherein the channels of the at least the portion of the plurality of slats each have a channel width having a size of 50%-200% of a size of a respective slope width.

Another aspect of the invention is any such food support grate, wherein each of the plurality of slats is spaced apart from a respective adjacent slat so that the channel of the respective adjacent slat is disposed to receive fluid dripping downward from the upper cooking surface of the each of the plurality of slats.

Another aspect of the invention is any such food support grate, wherein a first slat of the plurality of slats is spaced apart from a first adjacent slat by a first distance, a second slat of the plurality of slats is spaced apart from a second adjacent slat by a second distance, and the first distance is different than the second distance.

Another aspect of the invention is any such food support grate, further comprising a claw configured to couple the food support grate into a cooking unit, the claw including an abutment configured to position the channels of the at least the portion of the plurality of slats at a downward angle with respect to the cooking unit.

Another aspect of the invention is any such food support grate, wherein the downward angle is at least 5 degrees below horizontal.

Another aspect of the invention is any such food support grate, wherein a first slat of the plurality of slats is shaped as a "J"; the rear side and the front side of the first slat each have a portion positioned at a first oblique angle with respect to one of the upper and lower planes; the first slat is spaced apart from a respective adjacent slat by a first distance so that the channel of the respective adjacent slat is disposed to receive fluid dripping downward from the upper cooking surface of the first slat; a second slat of the plurality of slats is shaped as a wedge; the rear side and the front side of the second slat each have a portion positioned at a second oblique angle with respect to one of the upper and lower planes; the second slat is spaced apart from a respective adjacent slat by a second distance so that the channel of the respective adjacent slat is disposed to receive fluid dripping downward from the upper cooking surface of the second slat; and the first distance is different than the second distance and the first oblique angle is different than the second oblique angle.

A fifth aspect of the invention is achieved by performing a method, comprising providing a food support grate, the food support grate comprising a plurality of slats positioned parallel and in a spaced-apart relation to each other, each of the plurality of slats having an upper cooking surface having an upper apex; a lower cooking surface having a lower apex; a rear side that extends from the upper cooking surface to the lower cooking surface; and a front side; a plurality of bridges that each couple two or more adjacent slats of the plurality of slats to each other; wherein the upper apexes of the plurality of slats define an upper plane and the lower apexes of the plurality of slats define a lower plane; wherein the rear sides and the front sides of the plurality of slats each have a portion positioned at an oblique angle with respect to one of the upper and lower planes; and wherein the lower cooking surface of each of at least a portion of the plurality of slats has a convex shape on the bottom portion of the lower cooking surface, and further has a concave shape on the top portion of the lower cooking surface; providing a cooking unit; and positioning the food support grate in the cooking unit.

Another aspect of the invention is any such method, wherein each of the concave shapes on the top portions of the lower cooking surfaces of the at least the portion of the plurality of slats define a channel along the length of the respective slat of the at least the portion of the plurality of slats.

Another aspect of the invention is any such method, wherein the channel is configured to collect fluid draining down the front side of the respective slat.

Another aspect of the invention is any such method, wherein the at least the portion of the plurality of slats comprises all of the plurality of slats.

Another aspect of the invention is any such method, wherein the upper apex of each of the plurality of slats has a first radius of curvature, and the lower apex of each of the plurality of slats has a second radius of curvature, wherein the first radius of curvature is smaller than the second radius of curvature.

Another aspect of the invention is any such method, wherein the upper cooking surface of at least a second portion of the plurality of slats has a width that is smaller than a width of the respective lower cooking surface.

Another aspect of the invention is any such method, wherein the upper plane is parallel to the lower plane.

Another aspect of the invention is any such method, wherein positioning the food support grate in the cooking unit comprises positioning the food support grate in the cooking unit with the upper cooking surfaces facing upward.

Another aspect of the invention is any such method, wherein positioning the food support grate in the cooking unit comprises positioning the food support grate in the cooking unit with the lower cooking surfaces facing upward and the upper cooking surfaces facing downward.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1A-9 of the drawings, like numerals being used for like and corresponding parts of the various drawings.

Traditionally, a cooking unit (such as a range) may have a grate or grill that may hold food as the cooking unit is cooking the food. These traditional grates (and/or grills) may be made of grate members that have spacing in-between adjacent grate members. This spacing in-between adjacent grate members may allow heat to be directed from a heat source in the cooking unit to the food supported by the grate. Such traditional grates (and/or grills), however, may be deficient. For example, in order to provide a sufficient amount of heat to the food, the spacing in-between adjacent grate members of traditional grates may need to be large. Such large spacing may not be a problem for large food items (such as steaks), but it may cause problems for small food items and/or fragile food items. In particular, small food items and/or fragile food items (such as fish) may fall through the spacing as it is being cooked on the traditional grills. In light of this, small food items and/or fragile food items may typically be cooked in baskets (or other food vessels) that are placed on top of the traditional grates. As another example, the spacing in-between adjacent grate members may also allow food fluids (such as grease, fat, etc.) to drip down into the heat source of the cooking unit, which can cause undesirable flare ups. Contrary to such typical deficiencies, the food support grate 100 of FIGS. 1A-8 may provide one or more advantages.

Figure 1A:
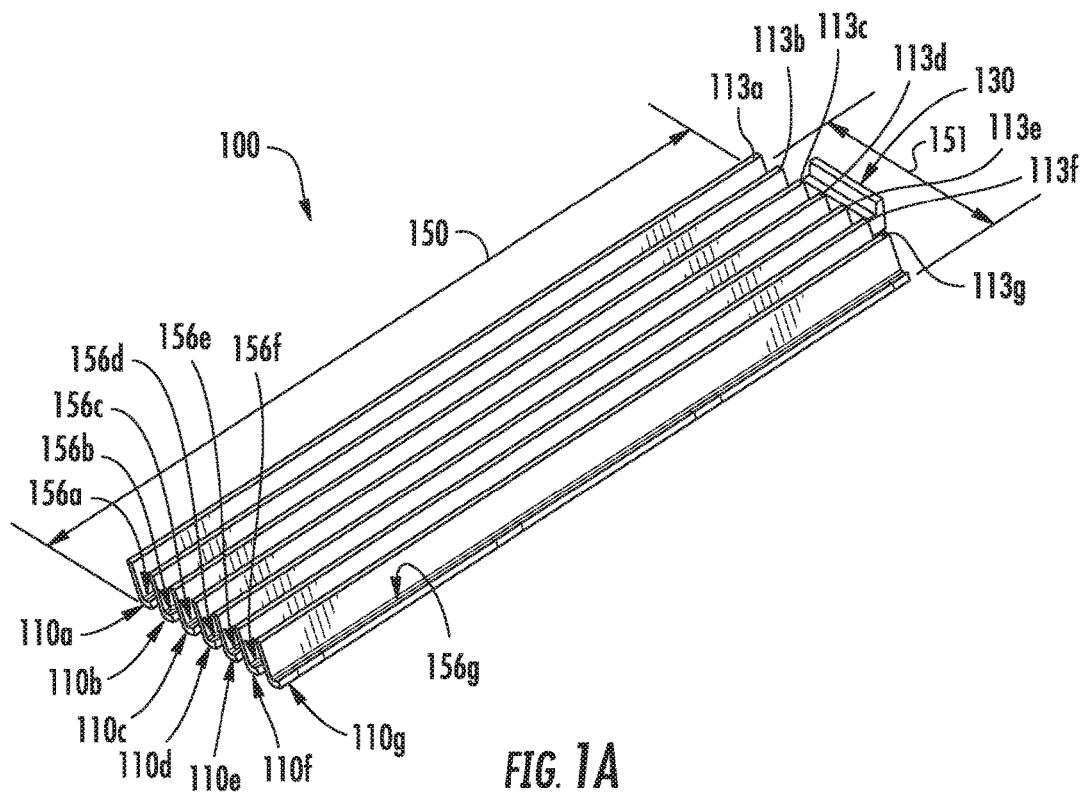
FIGS. 1A-1D illustrate an example food support grate.
Figure 1C:
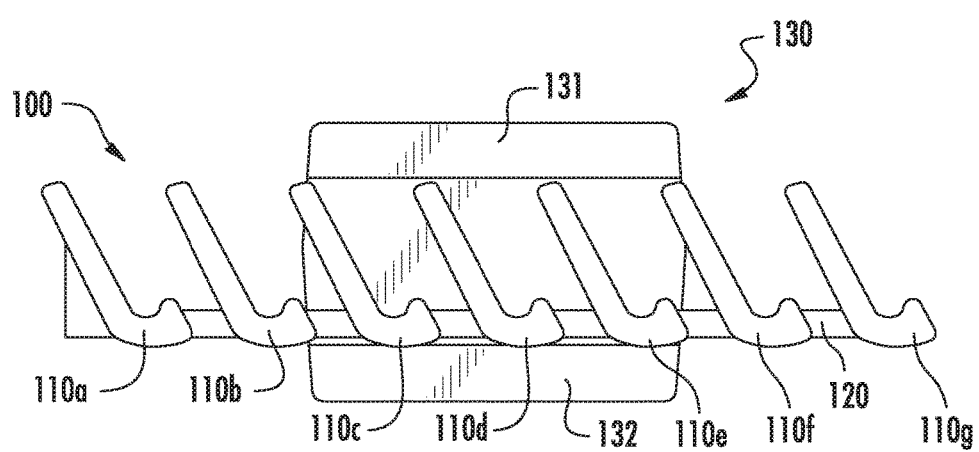
Figure 1B:
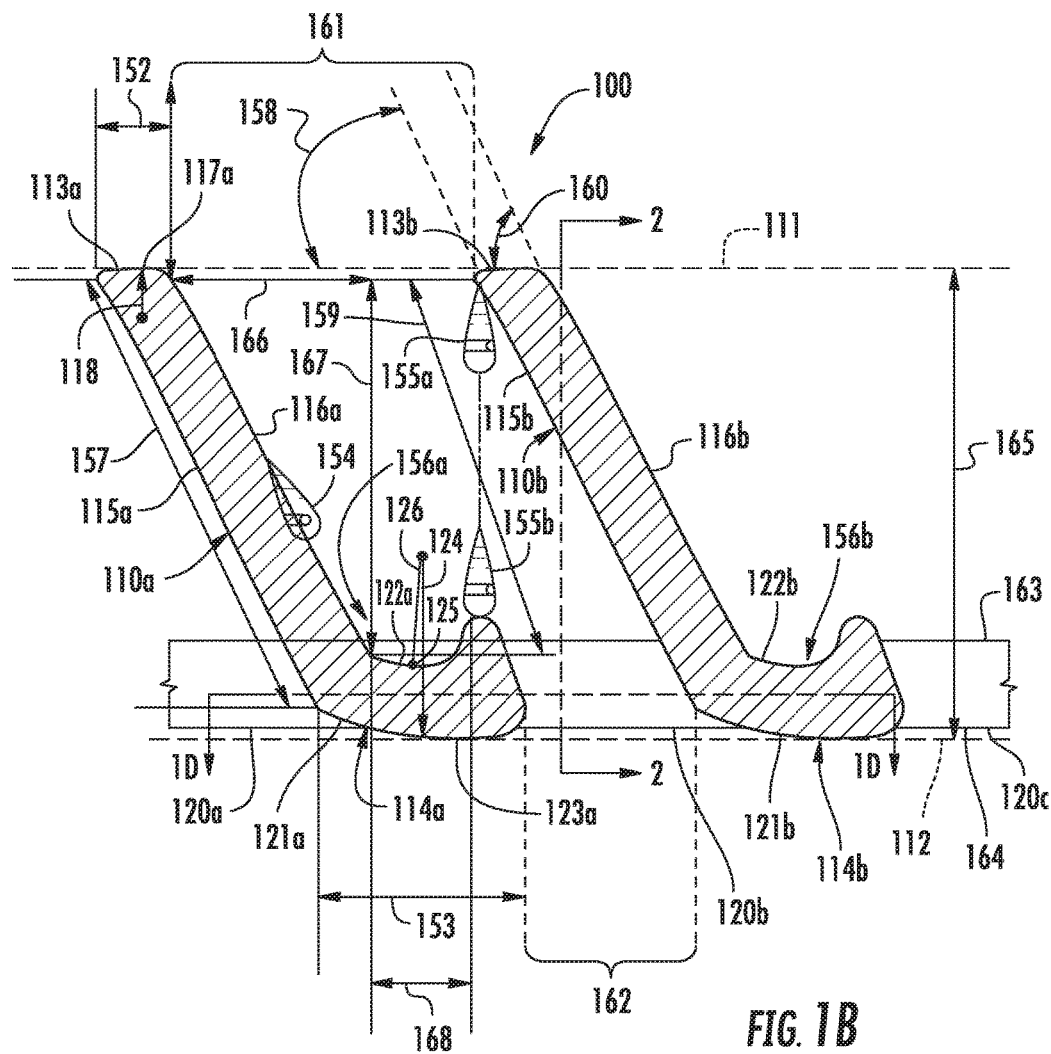
Figure 1D:
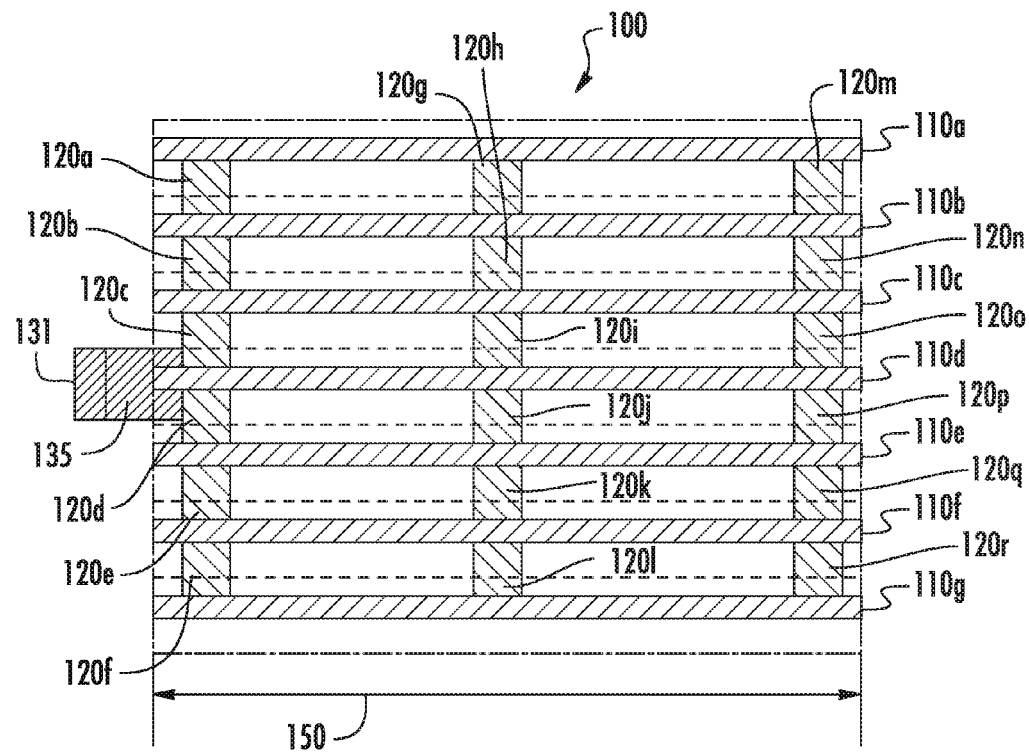

FIGS. 1A-1D illustrate an example food support grate. In particular, FIG. 1A illustrates a perspective view of a food support grate 100; FIG. 1B illustrates a cross-sectional view of a portion of the food support grate 100; FIG. 1C illustrates a front view of the food support grate 100; and FIG. 1D illustrates a cross-sectional view of a portion of the food support grate 100 taken at section line 1D of FIG. 1B. As illustrated, the cooking unit 100 includes slats 110, and bridges 120 that couple the slats 110 to each other. Each of the slats 110 has an upper cooking surface 113, a lower cooking surface 114, a rear side 115, and a front side 116. The upper cooking surface 113 of each slat 110 has an upper width 152 that is smaller than the lower width 153 of the lower cooking surface 114. As such, a user may cook larger food items, for example, on the upper cooking surface 113, and may cook smaller food items (and/or fragile food items) on the lower cooking surface 114, as the cooking unit 100 has a larger upper spacing 161 in-between the upper cooking surfaces 113 of two adjacent slats 110 than the smaller lower spacing 162 in-between the lower cooking surfaces 114 of the same two adjacent slats 110. Furthermore, a portion of the rear side 115 and/or the front side 116 is positioned at an oblique angle 158 to an upper plane 111 and/or a lower plane 112. The oblique angle 158 may allow fluids from food to drip from the upper cooking surface 113 of a first slat 110 (such as slat 110b) to the lower cooking surface 114 of a second slat 110 (such as slat 110a), thereby preventing the fluids from dripping into a cooking unit (or reducing the amount of fluids that drip into the cooking unit) and either causing a flare up or clogging a hole in a gas manifold. Additionally, the lower cooking surface 114 has a bottom portion 121 with a convex shape, and a top portion 122 with a concave shape. The convex shape may allow a cooking utensil to more easily move underneath food items positioned on the lower cooking surface 114. The concave shape may define a channel 156 that may collect fluids dripping from food items, and that may then direct the collected fluids away from the heat source of the cooking unit, thereby further preventing (or reducing) flare ups.

As illustrated, the food support grate 100 includes slats 110 (e.g., slats 110a-110g). A slat 110 may be any structure that may support all or a portion of a food item. For example, a slat 110 may be a slat, a slab, a panel, a generally elongated member with a high aspect ratio cross section and optionally having one or more curved or curvilinear portions, any other structure that may support all or a portion of a food item, or any combination of the preceding.

The food support grate 100 may include any number of slats 110. For example, the food support grate 100 may include 1 slat 110, 2 slats 110, 4 slats 110, 5 slats 110, 6 slats 110, 8 slats 110, 10 slats 110, 12 slats 110, 15 slats 110, 20 slats 110, 25 slats 110, 30 slats 110, 50 slats 110, 100 slats 110, or any other number of slats 110.

The slats 110 may be made of (or constructed of) any material. For example, the slats 110 may be made of steel, stainless steel, coated steel, aluminum, iron, brass, titanium, cast iron, any other metal or metal alloy (including coated, plated or clad metals), any other material, or any combination of the preceding. Furthermore, the slats 110 may be coated with one or more layers of porcelain, enamel, any other coating, or any combination of the preceding.

The slats 110 may be positioned in any manner with regard to each other. For example, the slats 110 may be positioned in a spaced apart relation to each other. In such an example, none of the slats 110 may be touching any of the other slats 110. Furthermore, such a spaced apart relation may create space in-between each adjacent slat 110. The spacing may be any distance. Further details regarding the spacing in-between adjacent slats 110 is discussed below in further detail with regard to upper spacing 161 and a lower spacing 162. The slats 110 may also be positioned at any angle with regard to each other. For example, the slats 110 may be positioned parallel to each other. As another example, the slats may be positioned approximately parallel to each other (i.e., parallel +/−2 degrees). All of the slats 110 may be positioned at the same angle (e.g., parallel) with regard to each other. Alternatively, one or more of the slats 110 may be positioned at different angles with regard to each other.

The slats 110 may have a length 150. The length 150 may be any size. For example, the length 150 may be 6 inches, 1 foot, 1.5 feet, 2 feet, 2.5 feet, 3 feet, 3.5 feet, 4 feet, 4.5 feet, 5 feet, 6 feet, or any other size. As another example, the length 150 may approximately (i.e., +/−3 inches) 6 inches, approximately 1 foot, approximately 1.5 feet, approximately 2 feet, approximately 2.5 feet, approximately 3 feet, approximately 3.5 feet, approximately 4 feet, approximately 4.5 feet, approximately 5 feet, approximately 6 feet, or any other approximate size. All of the slats 110 may have the same length 150. Alternatively, one or more of the slats 110 may have a different length 150 than the other slats 110.

The combination of all of the slats 110 of the food support grate 100 may have an overall width 151. The overall width 151 may be any size. For example, the overall width 151 may be 6 inches, 1 foot, 1.5 feet, 2 feet, 2.5 feet, 3 feet, 3.5 feet, 4 feet, 4.5 feet, 5 feet, 6 feet, or any other size. As another example, the overall width 151 may approximately (i.e., +/−3 inches) 6 inches, approximately 1 foot, approximately 1.5 feet, approximately 2 feet, approximately 2.5 feet, approximately 3 feet, approximately 3.5 feet, approximately 4 feet, approximately 4.5 feet, approximately 5 feet, approximately 6 feet, or any other approximate size.

The slats 110 may have any shape. For example, the slats 110 may be shaped as a "J" (where the "J" shape refers to a standard "J" or a backwards "J"), as a "L" (where the "L" shape refers to a standard "L" or a backwards "L"), a wedge, any other shape, or any combination of the preceding. As is illustrated in FIGS. 1A-1D, the slats 110 are shaped a "J". The slats 110 may further have any number of portions. As is illustrated, each of the slats 110 (e.g., slat 110*a*, 110*b*, 110*c*, 110*d*, 110*e*, 110*f*, or 110*g*) has an upper cooking surface 113 (e.g., upper cooking surface 113*a*, 113*b*, 113*c*, 113*d*, 113*e*, 113*f*, or 113*g*), a lower cooking surface 114 (e.g., lower cooking surface 114*a*, 114*b*, 114*c*, 114*d*, 114*e*, 114*f*, or 114*g*, some of which are not illustrated), a rear side 115 (e.g., rear side 115*a*, 115*b*, 115*c*, 115*d*, 115*e*, 115*f*, or 115*g*, some of which are not illustrated), and a front side 116 (e.g., front side 116*a*, 116*b*, 116*c*, 116*d*, 116*e*, 116*f*, or 116*g*, some of which are not illustrated).

The upper cooking surface 113 is a first surface that may support all or a portion of a food item. As is illustrated in FIGS. 1A-1D, the upper cooking surface 113 is the top portion of a slat 110. The upper cooking surface 113 may have any shape. For example, the upper cooking surface 113 may be flat, curved (e.g., a curve with a concave shape, a curve with a convex shape), slanted upward, slanted downward, pointed, any other shape, or any combination of the preceding. As is illustrated, the upper cooking surface 113 is curved, and the curve has a convex shape (i.e., the shape curves outward). The upper cooking surface 113 may have an upper apex 117. The upper apex 117 may be the highest point on the upper cooking surface 113.

When the upper cooking surface 113 is curved, the upper apex 117 may have a first radius of curvature 118. The first radius of curvature 118 may be any size. For example, the first radius of curvature 118 may be 0.1 inches, 0.2 inches, 0.3 inches, 0.5 inches, 0.6 inches, 0.75 inches, 0.8 inches, 0.9 inches, 1 inch, 1.5 inches, or any other size. As another example, the first radius of curvature 118 may be approximately (i.e., +/−0.1 inches) 0.1 inches, approximately 0.2 inches, approximately 0.3 inches, approximately 0.5 inches, approximately 0.6 inches, approximately 0.75 inches, approximately 0.8 inches, approximately 0.9 inches, approximately 1 inch, approximately 1.5 inches, or any other approximate size. As a further example, the first radius of curvature 118 may be at least approximately (i.e., +/−0.1 inches) 0.4 inches, at least approximately 0.5 inches, at least approximately 0.6 inches, at least approximately 0.75 inches, or at least approximately 0.8 inches. As a further example, the first radius of curvature 118 may be within the range of 0.1 inches-1 inch, 0.5 inches-0.75 inches, 0.5 inches-1 inch, 0.5 inches-2 inches, or any other range. All of the slats 110 may have the same first radius of curvature 118. Alternatively, one or more of the slats 110 may have a different first radius of curvature 118 than the other slats 110.

The upper apexes 117 of the slats 110 may define an upper plane 111. For example, each of the upper apexes 117 of the slats 110 may touch (or be flush with) the upper plane 111. The upper plane 111 may be defined by the upper apexes 117 of any number of the slats 110. For example, the upper plane 111 may be defined by the upper apexes 117 of all of the slats 110, approximately all of the slats 110 (i.e., all but 2 slats 110), 20% of the slats 110, 40% of the slats 110, 50% of the slats 110, 60% of the slats 110, 75% of the slats 110, 90% of the slats 110, 95% of the slats 110, 99% of the slats 110, or any other number of the slats 110. The upper plane 111 may have any orientation. For example, the upper plane 111 may be horizontal (e.g., when all of the upper apexes 117 extend to the same height). As another example, the upper plane 111 may be approximately horizontal (i.e., horizontal +/−15 degrees).

The upper cooking surface 113 may have an upper width 152. The upper width 152 may be any size. For example, the upper width 152 may be 0.05 inches, 0.08 inches, 0.1 inches, 0.15 inches, 0.2 inches, 0.25 inches, 0.3 inches, 0.4 inches, 0.48 inches, 0.5 inches, 0.55 inches, 0.6 inches, 0.75 inches, 0.8 inches, 0.9 inches, 1 inch, 1.5 inches, or any other size. As another example, the upper width 152 may be approximately (i.e., +/−0.05 inches) approximately 0.05 inches, approximately 0.08 inches, approximately 0.1 inches, approximately 0.15 inches, approximately 0.2 inches, approximately 0.25 inches, approximately 0.3 inches, approximately 0.4 inches, approximately 0.48 inches, approximately 0.5 inches, approximately 0.55 inches, approximately 0.6 inches, approximately 0.75 inches, approximately 0.8 inches, approximately 0.9 inches, approximately 1 inch, approximately 1.5 inches, or any other approximate size. As a further example, the upper width 152 may be at least approximately (i.e., +/−0.05 inches) 0.3 inches, at least approximately 0.4 inches, at least approximately 0.48 inches, at least approximately 0.5 inches, or at least approximately 0.75 inches. As a further example, the upper width 152 may be within the range of 0.05 inches-1 inch, 0.1 inches-1 inch, 0.3 inches-0.75 inches, 0.3 inches-0.55 inches, or any other range. All of the slats 110 may have an upper width 152 with the same size. Alternatively, one or more of the slats 110 may have an upper width 152 with a different size than the other slats 110.

As is illustrated, the slats 110 also have a lower cooking surface 114. The lower cooking surface 114 is a second surface that may support all or a portion of a food item. As is illustrated in FIGS. 1A-1D, the lower cooking surface 114 is the bottom portion of a slat 110. The lower cooking surface 114 may have a bottom portion 121 and a top portion 122. The bottom portion 121 of the lower cooking surface 114 may be the portion of the lower cooking surface 114 that may support all or a portion of a food item when the food support grate 100 is, for example, flipped upside down (or inverted) from the orientation of FIG. 1A-1C to that shown in FIG. 3B, so that the bottom portion 121 of the lower cooking surface 114 faces upward, and the upper cooking surface 113 faces downward. In such an example, food items may then be positioned on the bottom portion 121 of the lower cooking surface 114.

The bottom portion 121 of the lower cooking surface 113 may have any shape. For example, the bottom portion 121 may be flat, curved (e.g., a curve with a concave shape, a curve with a convex shape), slanted upward, slanted downward, pointed, any other shape, or any combination of the preceding. As is illustrated, the bottom portion 121 is curved, and the curve has a convex shape. All of the slats 110 may have a bottom portion 121 with the same shape (e.g., curved). Alternatively, one or more of the slats 110 may have a bottom portion 121 with a different shape than the other slats 110.

The bottom portion 121 of the lower cooking surface 113 may have a lower apex 123. The lower apex 123 may be the lowest point on the bottom portion 121 of the lower cooking surface 114. When the bottom portion 121 is curved, the lower apex 123 may have a second radius of curvature 124. The second radius of curvature 124 may be any size. For example, the second radius of curvature 124 may be 0.1 inches, 0.2 inches, 0.3 inches, 0.5 inches, 0.6 inches, 0.75 inches, 0.8 inches, 0.9 inches, 1 inch, 1.5 inches, or any other size. As another example, the second radius of curvature 124 may be approximately (i.e., +/−0.1 inches) 0.1 inches, approximately 0.2 inches, approximately 0.3 inches, approximately 0.5 inches, approximately 0.6 inches, approximately 0.75 inches, approximately 0.8 inches, approximately 0.9 inches, approximately 1 inch, approximately 1.5 inches, or any other approximate size. As a further example, the second radius of curvature 124 may be at least approximately (i.e., +/−0.1 inches) 0.4 inches, at least approximately 0.5 inches, at least approximately 0.6 inches, at least approximately 0.75 inches, or at least approximately 0.8 inches. As a further example, the second radius of curvature 124 may be within the range of 0.1 inches-1 inch, 0.5 inches-0.75 inches, 0.5 inches-1 inch, 0.5 inches-2 inches, or any other range. All of the slats 110 may have the same second radius of curvature 124. Alternatively, one or more of the slats 110 may have a second radius of curvature 124 that is different than the other slats 110.

The second radius of curvature 124 of a slat 110 may be the same size as the first radius of curvature 118 for that slat 110. Alternatively, the second radius of curvature 124 of a slat 110 may be a different size than the first radius of curvature 118 for that slat 110. For example, the second radius of curvature 124 may be bigger than the first radius of curvature 118 (with the first radius of curvature 118 being smaller than the second radius of curvature 124). In such an example, this smaller radius of curvature of the upper apex 117 of the upper cooking surface 113 may allow the upper cooking surface 113 to create grill lines in the food items being cooked on the upper cooking surface 113. Furthermore, this bigger radius of curvature of the lower apex 123 of the bottom portion 121 of the lower cooking surface 114 may allow one or more instruments (such as a spatula) to more easily fit underneath the food items being cooked on the lower cooking surface 114. In such an example, the one or more instruments may be positioned underneath a larger portion of the food item, thereby more effectively spreading the force applied to the food item when it is removed from (or moved on) the lower cooking surface 114. As such, fragile food items may be more gently removed (or moved), reducing the chance that the food item may break apart. As another example, the second radius of curvature 124 may be smaller than the first radius of curvature 118 (with the first radius of curvature 118 being bigger than the second radius of curvature 124). As is illustrated in FIGS. 1A-1D, the second radius of curvature 124 is bigger than the first radius of curvature 118 (with the first radius of curvature 118 being smaller than the second radius of curvature 124).

Additionally, all of the slats 110 may have a second radius of curvature 124 that is the same size as their first radius of curvature 118. Alternatively, one or more of the slats 110 may have a second radius of curvature 124 that is a different size than their first radius of curvature 118.

The lower apexes 123 of the slats 110 may define a lower plane 112. For example, each of the lower apexes 123 of the slats 110 may touch (or be flush with) the lower plane 112. The lower plane 112 may be defined by the lower apexes 123 of any number of the slats 110. For example, the lower plane 112 may be defined by the lower apexes 123 of all of the slats 110, approximately all of the slats 110 (i.e., all but 2 of the slats 110), 20% of the slats 110, 40% of the slats 110, 50% of the slats 110, 60% of the slats 110, 75% of the slats 110, 90% of the slats 110, 95% of the slats 110, 99% of the slats 110, or any other number of the slats 110. The lower plane 112 may have any orientation. For example, the lower plane 112 may be horizontal (e.g., when the lower apexes 123 of the slats 110 extend downward to the same height). As another example, the lower plane 112 may be approximately horizontal (i.e., horizontal +/−15 degrees).

The lower plane 112 may have any orientation with regard to the upper plane 111. For example, the lower plane 112 may be parallel to the upper plane 111. As another example, the lower plane 112 may be approximately parallel to the upper plane 111 (i.e., parallel +/−15 degrees). The lower plane 112 and the upper plane 111 may be positioned from each other by a plane distance 165. The plane distance 165 may be any distance. For example, the plane distance 165 may be 0.5 inches, 0.8 inches, 0.9 inches, 1.0 inch, 1.1 inches, 1.2 inches, 1.5 inches, 2 inches, 2.5 inches, 3 inches, or any other distance. As another example, the plane distance 165 may be approximately (i.e., +/−0.5 inches) 0.5 inches, approximately 0.8 inches, approximately 0.9 inches, approximately 1.0 inch, approximately 1.1 inches, approximately 1.2 inches, approximately 1.5 inches, approximately 2 inches, approximately 2.5 inches, approximately 3 inches, or any other approximate distance. In one example, the plane distance 165 is preferably approximately 1.0 inch.

The lower cooking surface 114 may have a lower width 153. The lower width 153 may be any size. For example, the lower width 153 may be 0.05 inches, 0.08 inches, 0.1 inches, 0.15 inches, 0.2 inches, 0.25 inches, 0.3 inches, 0.4 inches, 0.48 inches, 0.5 inches, 0.55 inches, 0.6 inches, 0.75 inches, 0.8 inches, 0.9 inches, 1 inch, 1.5 inches, or any other size. As another example, the lower width 153 may be approximately (i.e., +/−0.05 inches) 0.05 inches, approximately 0.08 inches, approximately 0.1 inches, approximately 0.15 inches, approximately 0.2 inches, approximately 0.25 inches, approximately 0.3 inches, approximately 0.4 inches, approximately 0.48 inches, approximately 0.5 inches, approximately 0.55 inches, approximately 0.6 inches, approximately 0.75 inches, approximately 0.8 inches, approximately 0.9 inches, approximately 1 inch, approximately 1.5 inches, or any other approximate size. As a further example, the lower width 153 may be at least approximately (i.e., +/−0.05 inches) 0.3 inches, at least approximately 0.4 inches, at least approximately 0.48 inches, at least approximately 0.5 inches, or at least approximately 0.75 inches. As a further example, the lower width 153 may be within the range of 0.05 inches-1 inch, 0.1 inches-1 inch, 0.3 inches-0.75 inches, 0.3 inches-0.55 inches, or any other range.

All of the slats 110 may have a lower width 153 that is the same size. Alternatively, one or more of the slats 110 may have a lower width 153 that is a different size than the other slats 110.

The lower width 153 of the lower cooking surface 114 of a slat 110 may be the same size as the upper width 152 of the upper cooking surface 113 of that slat 110. Alternatively, the lower width 153 may be a different size than the upper width 152. For example, the lower width 153 may be bigger than the upper width 152 (with the upper width 152 being smaller than the lower width 153). As another example, the lower width 153 may be smaller than the upper width 152 (with the upper width 152 being bigger than the lower width 153). The different sizes of the lower width 153 and the upper width 152 may allow the food support grate 100 to be used to cook different types of food items. For example, a large width of a cooking surface may allow the cooking surface to be used to better (or more easily) cook smaller and/or more fragile food items (such as fish), while a small width of a cooking surface may allow the cooking surface to be used to better (or more easily) cook bigger food items (such as steaks). In such an example, the different sizes of the lower width 153 and the upper width 152 may allow the food support grate 100 to have cooking surfaces with slats 110 with two different widths. As such, the cooking surface with the larger width (e.g., lower cooking surface 114 of FIGS. 1A-1D) may be used to better (or more easily) cook smaller and/or more fragile food items (such as fish), while the cooking surface with the smaller width (e.g., upper cooking surface 113 of FIGS. 1A-1D) may be used to better (or more easily) cook bigger food items (such as steaks).

Additionally, all of the slats 110 may have a lower width 153 that is the same size as their upper width 152. Alternatively, one or more of the slats 110 may have a lower width 153 that is a different size than their upper width 152.

As is discussed above, the lower cooking surface 114 may also have a top portion 122. The top portion 122 of the lower cooking surface 114 may be the portion of the lower cooking surface 114 that may collect fluids draining from the food items. For example, fluids from food items may drain from the food items and drip off of the upper cooking surface 113 into the top portion 122 of the lower cooking surface 114, thereby preventing the fluids from falling into the heat source of a cooking unit (or reducing the amount of fluids that fall into the heat source of the cooking unit). In such an example, the fluids may drip off of, for example, cooking surface 113a, drip down the front side 116a, and collect into the top portion 122a of the lower cooking surface 114a of slat 110a, as is illustrated by fluid drip 154 of FIG. 1B. Furthermore, the fluids may drip off of, for example, cooking surface 113b of slat 110b, drip onto the top portion 122a of the lower cooking surface 114a of slat 110a, and collect into the top portion 122a of the lower cooking surface 114a of slat 110a, as is illustrated by fluid drips 155a and 155b of FIG. 1B. The fluid may remain in the top portion 122 of the lower cooking surface 114, or it may flow toward a fluid collector (as is discussed below with regard to FIG. 2).

All of the slats 110 may have a top portion 122 of the lower cooking surface 114. Alternatively, one or more of the slats 110 may not have a top portion of the lower cooking surface 114. When a slat 110 does not have a top portion 122, the slat 110 may be unable to collect fluid that drips from a food item, for example.

The top portion 122 of the lower cooking surface 114 may have any shape. For example, the top portion 122 may be flat, curved (e.g., a curve with a concave shape, a curve with a convex shape), slanted upward, slanted downward, pointed, any other shape, or any combination of the preceding. As is illustrated, the top portion 122 of the lower cooking surface 114 is curved, and the curve has a concave shape (i.e., the shape curves inward). All of the slats 110 may have a top portion 122 with the same shape (e.g., curved). Alternatively, one or more of the slats 110 may have a top portion 122 with a different shape than the other slats 110.

The shape of the top portion 122 may define a channel along the length 150 of the slats 110. For example, as is illustrated in FIGS. 1A-1B, the concave shape of the top portion 122 may define the channel 156 along the length 150 of the slats 110. The channel 156 may be a portion of the top portion 122 that may collect the fluid dripping from a food item. The channel 156 may be any type of structure for collecting the fluid dripping from a food item. It should be understood that the term channel generally refers to a fluid containing depression that runs along the length 150 of a slat 110 so as to direct fluid that accumulates in the depression to one edge (such as the front edge) of the cooking unit (such as a grill). In one example, the slats 110 preferably have a spacing and tilt angle (or slope, as is discussed below) that maximizes the fluid capture of these channels 156 while still allowing radiant energy to reach the foods supported on the slat 110 and further allowing hot combustion gases to rise and vent between the slats 110. Depending on the nature of the food being cooked, and its capacity of fats that will be rendered during cooking, it may be desirable to provide different combinations of slit spacing, sizes, tilt angles (or slopes), and channel dimensions to optimize the food supporting capacity of the slats 110 and the fluid draining capacity. In addition to collecting the fluid dripping from a food item, the channel 156 may further provide a passage that allows the fluid to flow along the length 150 of the channel 156 and out of the slat 110 (such as into a fluid collector, as is discussed below with regard to FIG. 2). Alternatively (or additionally), all or a portion of the fluid may remain in the channel 156 until it is cleaned out, such as by a user of the food supporting grate 110.

In one example, the channel 156 is preferably dimensioned at a size that facilitates the collection and draining capacity of the channel 156, as well as facilitates subsequent cleaning after use. For example, the channel 156 may have a channel width 168 having a size that facilitates the collection and draining capacity of the channel 156, as well as facilitates subsequent cleaning after use. In one example, the channel width 168 preferably has a size that is within 50%-200% of the size of the slope width 166 (discussed below).

The channel 156 may extend over any portion of the length 150 of the slat 110. For example, the channel 156 may extend over the entire length of the slat 110 (as is illustrated in FIG. 1A). All of the slats 110 may include a channel 156 (as is illustrated in FIG. 1A). Alternatively, one or more of the slats 110 may not include a channel 156.

The top portion 122 of the lower cooking surface 114 may have a top portion apex 125. The top portion apex 125 may be the lowest point on the top portion 122. When the top portion 122 is curved (as is discussed above), the top portion apex 125 may have a third radius of curvature 126. The third radius of curvature 126 may be any size. For example, the third radius of curvature 126 may be 0.03 inches, 0.04 inches, 0.05 inches, 0.06 inches, 0.07 inches, 0.08 inches, 0.09 inches, 0.1 inches, 0.2 inches, 0.3 inches, 0.5 inches, 0.6 inches, 0.75 inches, 0.8 inches, 0.9 inches, 1 inch, 1.5 inches, or any other size. As another example, the third radius of curvature 126 may be approximately (i.e., +/−0.03 inches) 0.03 inches, approximately 0.04 inches, approximately 0.05 inches, approximately 0.06 inches, approximately 0.07 inches, approximately 0.08 inches, approximately 0.09 inches, approximately 0.1 inches, approximately 0.2 inches, approximately 0.3 inches, approximately 0.5 inches, approximately 0.6 inches, approximately 0.75 inches, approximately 0.8 inches, approximately 0.9 inches, approximately 1 inch, approximately 1.5 inches, or any other approximate size. As a further example, the third radius of curvature 126 may be at least approximately (i.e., +/−0.03 inches) 0.03 inches, at least approximately 0.05 inches, at least approximately 0.07 inches, at least approximately 0.09 inches, at least approximately 0.1 inches, or at least approximately 0.2 inches. As a further example, the third radius of curvature 126 may be within the range of 0.03 inches-2 inches, 0.03 inches-1 inch, 0.05 inches-0.2 inches, 0.05 inches-0.09 inches, or any other range. The third radius of curvature 126 of a slat 110 may be the same size along the entire length 150 of the slat 110, or the third radius of curvature 126 of a slat 110 may vary in size along the entire length 150 of the slat 110.

The third radius of curvature 126 may be the same size as the second radius of curvature 124. Alternatively, the third radius of curvature 126 may be a different size than the second radius of curvature 124. For example, the third radius of curvature 126 may be smaller than the second radius of curvature 124 (with the second radius of curvature 124 being bigger than the third radius of curvature 126). Additionally, all of the slats 110 may have a third radius of curvature 126 that is the same size as their second radius of curvature 124. Alternatively, one or more of the slats 110 may have a third radius of curvature 126 that is a different size as their second radius of curvature 124.

As is illustrated, the slats 110 also have a rear side 115. The rear side 115 is a portion of the slat 110 that extends from the upper cooking surface 113 to the lower cooking surface 114. As is illustrated in FIG. 1B, the rear side 115 is the left-side of the slat 110.

The rear side 115 may have a rear height 157 that extends from the upper cooking surface 113 to the lower cooking surface 114. The rear height 157 may be any size. For example, the rear height 157 may be 0.5 inches, 0.8 inches, 1 inch, 1.2 inches, 1.5 inches. 1.8 inches, 2 inches, 2.5 inches, 3 inches, 4 inches, or any other size. As another example, the rear height 157 may be approximately (i.e., +/−0.5 inches) 0.5 inches, approximately 0.8 inches, approximately 1 inch, approximately 1.2 inches, approximately 1.5 inches. approximately 1.8 inches, approximately 2 inches, approximately 2.5 inches, approximately 3 inches, approximately 4 inches, or any other approximate size. As a further example, the rear height 157 may be at least approximately (i.e., +/−0.5 inches) 0.5 inches, at least approximately 0.8 inches, at least approximately 1 inch, at least approximately 1.5 inches, or at least approximately 2 inches. The rear side 115 may also have the length 150 discussed above.

The rear side 115 may have any shape. For example, the rear side 115 may be flat, curved, irregular, at least partly linear, curvilinear, any combination of linear and curvilinear, any other shape, or any combination of the preceding. The rear side 115 may have any orientation. For example, the rear side 115 may be positioned at a rear oblique angle 158 to the upper plane 111 and/or the lower plane 112. The rear oblique angle 158 may refer to any angle that is neither parallel nor at 90 degrees to the upper plane 111 and/or the lower plane 112. This rear oblique angle 158 may cause the slat 110 to be tilted with regard to the upper plane 111 and/or the lower plane 112. The rear oblique angle 158 may, for example, allow a portion of the upper cooking surface 113 of a first slat 110 (such as a portion of the upper cooking surface 113b of slat 110b) to be positioned above a portion of the top portion 122 of a lower cooking surface 114 of a second slat 110 (such as a portion of the top portion 122a of the lower cooking surface 114a of slat 110a). In such an example, this positioning may allow fluids from food items to drip from the upper cooking surface 113 of the first slat 110 (such as a portion of the upper cooking surface 113b of slat 110b) to the top portion 122 of the lower cooking surface 114 of the second slat 110 (such as the top portion 122a of the lower cooking surface 114a of slat 110a), as is illustrated by fluid drips 155a and 155b of FIG. 1B. This may prevent the fluids from dripping into a cooking unit (or reduce the amount of fluids that drip into the cooking unit) and causing an undesirable flare up.

The rear oblique angle 158 may be any oblique angle. For example, the rear oblique angle 158 may be 45 degrees, 50 degrees, 60 degrees, 65 degrees, 70 degrees, 75 degrees, 80 degrees, 100 degrees, 105 degrees, 110 degrees, 115 degrees, 120 degrees, 130 degrees, 135 degrees, or any other oblique angle. As another example, the rear oblique angle 158 may be approximately (i.e., +/−5 degrees) 45 degrees, approximately 50 degrees, approximately 60 degrees, approximately 65 degrees, approximately 70 degrees, approximately 75 degrees, approximately 80 degrees, approximately 100 degrees, approximately 105 degrees, approximately 110 degrees, approximately 115 degrees, approximately 120 degrees, approximately 130 degrees, approximately 135 degrees, or any other approximate oblique angle. As another example, the oblique angle 158 may be within the range of 45 degrees-80 degrees, 50 degrees-65 degrees, 55 degrees-75 degrees, 100 degrees-135 degrees, 115 degrees-130 degrees, 105 degrees-125 degrees, or any other range. In one example, the oblique angle 158 is preferably approximately 65 degrees when the plane distance 165 is approximately 1 inch. In another example, the oblique angle 158 is preferably 60 degrees-62 degrees.

The rear side 115 may be positioned at a rear oblique angle 158 to one of the upper plane 111 and the lower plane 112 (i.e., the rear side 115 may be positioned at a rear oblique angle 158 to either the upper plane 111, the lower plane 112, or both the upper plane 111 and the lower plane 112). Furthermore, any portion of the rear side 115 may be positioned at a rear oblique angle 158 to the upper plane 111 and/or the lower plane 112. For example, all of the rear side 115 may be positioned at a rear oblique angle 158 to the upper plane 111 and/or the lower plane 112. Alternatively, a portion less than all of the rear side 115 (e.g., 20% of the rear side 115, 40% of the rear side 115, 50% of the rear side 115, 60% of the rear side 115, 75% of the rear side 115, 90% of the rear side 115, 95% of the rear side 115, 99% of the rear side 115, or any other portion of the rear side 115) may be positioned at a rear oblique angle 158 to the upper plane 111 and/or the lower plane 112.

All of the slats 110 may have a rear side 115 positioned at a rear oblique angle 158 to the upper plane 111 and/or the lower plane 112. Alternatively, one or more of the slats 110 may have a rear side 115 that is not positioned at a rear oblique angle 158 to the upper plane 111 and/or the lower plane 112.

All of the slats 110 may have the same rear oblique angle 158. Alternatively, one or more of the slats 110 may have a different rear oblique angle 158 than the other slats 110. As an example of this, one or more of the slats 110 may each have a rear side 115 that is positioned at a 62 degree angle, while one or more of the remaining slats 110 may each have a rear side 115 that is positioned at a 118 degree angle (causing the slats 110 to tilt in opposite directions, for example).

As is illustrated, the slats 110 also have a front side 116. The front side 116 is a second portion of the slat 110 that extends from the upper cooking surface 113 to the lower cooking surface 114. The front side 116 may be the opposite side of the rear side 115. As is illustrated in FIG. 1B, the front side 116 is the right-side of the slat 110.

The front side 116 may have a front height 159 that extends from the upper cooking surface 113 to the lower cooking surface 114. The front height 158 may be any size. For example, the front height 159 may be 0.5 inches, 0.8 inches, 1 inch, 1.2 inches, 1.5 inches. 1.8 inches, 2 inches, 2.5 inches, 3 inches, 4 inches, or any other size. As another example, the front height 159 may be approximately (i.e., +/−0.5 inches) 0.5 inches, approximately 0.8 inches, approximately 1 inch, approximately 1.2 inches, approximately 1.5 inches. approximately 1.8 inches, approximately 2 inches, approximately 2.5 inches, approximately 3 inches, approximately 4 inches, or any other approximate size. As a further example, the front height 159 may be at least approximately (i.e., +/−0.5 inches) 0.5 inches, at least approximately 0.8 inches, at least approximately 1 inch, at least approximately 1.5 inches, or at least approximately 2 inches.

The front height 159 of a slat 110 may be the same size as the rear height 157 for that slat 110. Alternatively, the front height 159 may be a different size than the rear height 157. For example, the front height 159 may be bigger than the rear height 157 (with the rear height 157 being smaller than the front height 159). As another example, the front height 159 may be smaller than the rear height 157 (with the rear height 157 being bigger than the front height 159). The front side 116 may also have the length 150 discussed above.

The front side 116 may have any shape. For example, the front side 116 may be flat, curved, irregular, at least partly linear, curvilinear, any combination of linear and curvilinear, any other shape, or any combination of the preceding.

The front side 116 may have any orientation. For example, the front side 116 may be positioned at a front oblique angle 160 to the upper plane 111 and/or the lower plane 112. The front oblique angle 160 may refer to any angle that is neither parallel nor at 90 degrees to the upper plane 111 and/or the lower plane 112. This front oblique angle 160 may cause the slat to be tilted with regard to the upper plane 111 and/or the lower plane 112. The front oblique angle 160 may, for example, allow fluids from a food item to drip off an upper cooking surface 113 and gradually drip down the front side 116 toward the top portion 122 of the lower cooking surface 114, as is illustrated by fluid drip 154 of FIG. 1B. This gradual drippage down the front side 116 may prevent splattering of the fluids, which may prevent a portion of the fluid from being splattered into a cooking unit (or reduce the amount of splattering into a cooking unit) and causing an undesirable flare up.

The front oblique angle 160 may be any oblique angle. For example, the front oblique angle 160 may be 45 degrees, 50 degrees, 60 degrees, 65 degrees, 70 degrees, 75 degrees, 80 degrees, 100 degrees, 105 degrees, 110 degrees, 115 degrees, 120 degrees, 130 degrees, 135 degrees, or any other oblique angle. As another example, the front oblique angle 160 may be approximately (i.e., +/−5 degrees) 45 degrees, approximately 50 degrees, approximately 60 degrees, approximately 65 degrees, approximately 70 degrees, approximately 75 degrees, approximately 80 degrees, approximately 100 degrees, approximately 105 degrees, approximately 110 degrees, approximately 115 degrees, approximately 120 degrees, approximately 130 degrees, approximately 135 degrees, or any other approximate oblique angle. As another example, the front oblique angle 160 may be within the range of 45 degrees-80 degrees, 50 degrees-65 degrees, 55 degrees-75 degrees, 100 degrees-135 degrees, 115 degrees-130 degrees, 105 degrees-125 degrees, or any other range. In one example, the front oblique angle 160 is preferably approximately 65 degrees when the plane distance 165 is approximately 1 inch. In another example, the front oblique angle 160 is preferably 60 degrees-62 degrees.

The front side 116 may be positioned at a front oblique angle 160 to one of the upper plane 111 and the lower plane 112 (i.e., the front side 116 may be positioned at a front oblique angle 160 to either the upper plane 111, the lower plane 112, or both the upper plane 111 and the lower plane 112). Furthermore, any portion of the front side 116 may be positioned at a front oblique angle 160 to the upper plane 111 and/or the lower plane 112. For example, all of the front side 116 may be positioned at a front oblique angle 160 to the upper plane 111 and/or the lower plane 112, or a portion less than all of the front side 116 (e.g., 20% of the front side 116, 40% of the front side 116, 50% of the front side 116, 60% of the front side 116, 75% of the front side 116, 90% of the front side 116, 95% of the front side 116, 99% of the front side 116, or any other portion of the front side 116) may be positioned at a front oblique angle 160 to the upper plane 111 and/or the lower plane 112.

The front oblique angle 160 may cause the front side 116 to be positioned at a slope, as is illustrated in FIG. 1B. The slope of the front side 116 may have a slope width 166 and a slope height 167. The slope width 166 may be any size. For example, the slope width 166 may be within a range of 0.4 inches-0.6 inches. In one example, the slope width 166 is preferably approximately 0.453 inches (i.e., 0.453 inches+/−0.1 inches) when the front oblique angle 160 is within a range of 60-62 degrees. The slope height 167 may be any size. For example, the slope height 167 may be within a range of 0.7 inches-0.9 inches. In one example, the slope height 167 is preferably approximately 0.784 inches (i.e., 0.784 inches+/−0.1 inches) when the front oblique angle 160 is within a range of 60-62 degrees. In one example, the sizes of the slope width 166 and the slope height 167 may be selected to provide a particular ratio of slope width 166 to slope height 167. For example, if the slope width 166 is too large in comparison to the slope height 167, the slats 110 of the food support grate 100 may impede the exhaustion of hot air and combustion gas. Alternatively, if the slope width 166 to too small in comparison to the slope height 167, the slat 110 may be less likely to prevent fluids from dripping into a cooking unit (or less likely to reduce the amount of fluids that drip into the cooking unit). In one example, the ratio of slope height 167 to slope width 166 is preferably 1.729-1.883 when the front oblique angle 160 is within a range of 60-62 degrees. In another example, the ratio of slope height 167 to slope width 166 is preferably 1.802.

All of the slats 110 may have a front side 116 that is positioned at a front oblique angle 160 to the upper plane 111 and/or the lower plane 112. Alternatively, one or more of the slats 110 may have a front side 116 that is not positioned at a front oblique angle 160 to the upper plane 111 and/or the lower plane 112. All of the slats 110 may have a front oblique angle 160 that is the same angle as the other slats 110. Alternatively, one or more of the slats 110 may have a front oblique angle 160 that is a different angle than the other slats 110. As an example, one or more of the slats 110 may each have a front side 116 that is positioned at a 62 degree angle, while one or more of the remaining slats 110 may each have a front side that is positioned at a 118 degree angle (causing the slats 110 to tilt in opposite directions, for example).

The front oblique angle 160 of the front side 116 of a slat 110 may be the same as the rear oblique angle 158 of the rear side 115 of that slat 110. Alternatively, the front oblique angle 160 of the front side 116 of a slat 110 may be different than the rear oblique angle 158 of the rear side 115 of that slat 110. For example, the front oblique angle 160 of the front side 116 may be bigger than the rear oblique angle 158 of the rear side 115 (with the rear oblique angle 158 of the rear side 115 being smaller than the front oblique angle 160 of the front side 116). As another example, the front oblique angle 160 of the front side 116 may be smaller than the rear oblique angle 158 of the rear side 115 (with the rear oblique angle 158 of the rear side 115 being bigger than the front oblique angle 160 of the front side 116). As is illustrated in FIG. 1B, the front oblique angle 160 of the front side 116 is approximately equal the rear oblique angle 158 of the rear side 115 (i.e., equal +/−5 degrees).

As illustrated, the food support grate 100 further includes bridges 120 (which are individually denoted as bridges 120a-120r in FIG. 1D). A bridge 120 may be any structure that may couple slats 110 to each other. For example, a bridge 120 may be a bridge, a rod, a bar, a slab, a panel, a pipe, a connector, a board, any other structure that spans the gap between adjacent slats 110 and that may couple the slats 110 to each other, or any combination of the preceding.

A bridge 120 may have any shape and/or size. Furthermore, the bridge 120 may be made of (or constructed of) any material. For example, the bridge 120 may be made of steel, stainless steel, coated steel, aluminum, iron, brass, titanium, cast iron, any other metal or metal alloy (including coated, plated or clad metals), any other material, or any combination of the preceding. Furthermore, the bridge 120 may be coated with one or more layers of porcelain, enamel, any other coating, or any combination of the preceding. The bridge 120 may be made of the same material as the slats 110, or the bridge 120 may be made of a different material than the slats 110.

A bridge 120 may have a top bridge surface 163 and a bottom bridge surface 164. The top bridge surface 163 may be highest portion of the bridge 120, and the bottom bridge surface 164 may be the lowest portion of the bridge 120. The top bridge surface 163 may be positioned at any height of the food support grate 110. For example, the top bridge surface 163 may be positioned in-between the upper plane 111 and the lower plane 112, positioned flush (or touching) the upper plane 111 (thereby forming another cooking surface, for example), positioned above the upper plane 111 (thereby forming another cooking surface, for example), or positioned at any other height of the food support grate 110. The bottom bridge surface 164 may be positioned at any height of the food support grate 110 below the top bridge surface 163. For example, the bottom bridge surface 164 may be positioned in-between the upper plane 111 and the lower plane 112, positioned flush (or touching) the lower plane 112 (thereby forming another cooking surface, for example), positioned below the lower plane 112 (thereby forming another cooking surface, for example), or positioned at any other height of the food support grate 110 below the top bridge surface 163.

A bridge 120 may be positioned at any orientation with regard to the slats 110. For example, the bridge 120 may be positioned perpendicular to the length 150 of the slats 110 (as is illustrated in FIG. 1D), approximately perpendicular to the length 150 of the slats 110 (i.e., perpendicular +/−5 degrees), parallel to the length 150 of the slats 110, approximately parallel to the length 150 of the slats 110 (i.e., parallel +/−5 degrees), at an oblique angle to the length 150 of the slats 110 (such as any of the oblique angles discussed above), or at any other orientation with regard to the slats 110. All of the bridges 120 may be positioned at the same orientation with regard to the slats 110. Alternatively, one or more of the bridges 120 may be positioned at a different orientation than the other bridges 120 with regard to the slats 110.

The food support grate 100 may include any number of bridges 120. For example, the food support grate 100 may include 1 bridge 120, 2 bridge 120, 3 bridges 120, 4 bridges 120, 5 bridges 120, 6 bridges 120, 8 bridges 120, 10 bridges 120, 12 bridges 120, 15 bridges 120, 18 bridges, 20 bridges 120, 30 bridges 120, 40 bridges, 50 bridges, or any other number of bridges 120. As is illustrated in FIG. 1D, the food support grate 100 includes 18 bridges 120 (i.e., bridges 120a-120r), with each bridge 120 coupling two slats 110 to each other (e.g., bridge 120a couples slat 110a to slat 110b).

Figure 4:
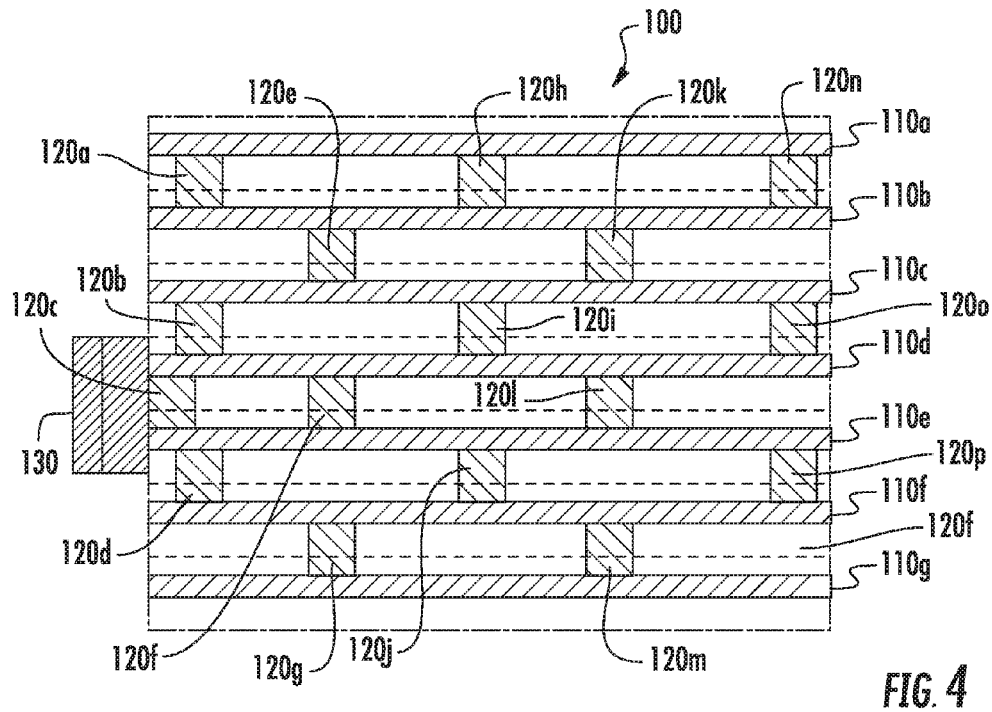
FIG. 4 illustrates another example food support grate.

The bridges 120 may be positioned at any location with regard to each other. For example, the bridges 120 may be positioned in straight rows (as is illustrated by bridges 120a-120f of FIG. 1D), positioned in staggered rows (as is illustrated in FIG. 4), or any other location with regard to each other. As another example, one or more groups of bridges 120 may be positioned in straight rows, and one or more groups of bridges 120 may be positioned in staggered rows (or in any other location with regard to each other).

As is discussed above, a bridge 120 may couple slats 110 to each other. A bridge 120 may couple any number of slats 110 to each other. For example, a bridge 120 may couple 2 slats 110 to each other, 3 slats 110 to each other, 4 slats 110 to each other, 5 slats 110 to each other, 6 slats 110 to each other, 10 slats 110 to each other, 20 slats 110 to each other, all of the slats 110 of a food support grate 100 to each other, or any other number of slats 110 to each other. As is illustrated in FIG. 1D, a bridge 120 couples two slats 110 to each other (e.g., bridge 120a couples slat 110a to slat 110b). Furthermore, two or more slats 110 may be coupled to each other by more than one bridge 120. For example, as is also illustrated in FIG. 1D, the first bridge 120a, the second bridge 120g, and the third bridge 120m each couple slat 110a to slat 110b.

A bridge 120 may couple slats 110 to each other in any manner. As an example, the bridge 120 may be coupled to the slats 110, thereby coupling the slats 110 to each other. A bridge 120 may be coupled to the slats 110 (thereby coupling the slats 110 to each other) in any manner. For example, the bridge 120 may be bolted to the slats 110, screwed to the slats 110, riveted to the slats 110, clipped or snapped into the slats 110, welded to the slats 110, formed integral with the slats 110, coupled to the slats 110 in any other manner, or any combination of the preceding. In one example, the bridges 120 are preferably formed integral with the slats 110 by casting to reduce cost. Furthermore, the bridges 120 are preferably positioned no more frequent than needed to provide adequate strength of the food support grate 100, so as to reduce weight and facilitate cleaning. Positioning the top bridge surface 163 and/or the bottom bridge surface 164 of a bridge 120 adjacent to (or, in one example, preferably just below) the upper cooking surfaces 113 or adjacent to (or, in one example, preferably just above) the lower cooking surfaces 114 of the slats 110 facilitates such cleaning coincident with the cleaning of the surfaces of the slats 110, for example. When the surface of the bridges 120 is at least slightly below/above the surface of the slats 110, the cooking residue that can accumulate on the surface of bridge 120 is reduced, for example.

A bridge 120 may be coupled to any portion of a slat 110. For example, the bridge 120 may be coupled to the upper cooking surface 113, the lower cooking surface 114, the rear side 115, the front side 116, a first end extending between the rear side 115 and the front side 116 (e.g., the end facing out of the paper in FIG. 1B), a second end extending between the rear side 115 and the front side 116 (e.g., the unseen end facing into the paper in FIG. 1B), any other portion of the slat 110, or any combination of the preceding. In one example, a bridge 120 may be coupled to the first end extending between the rear side 115 and the front side 116 (e.g., the side facing out of the paper in FIG. 1B) of all of the slats 110. In another example, a bridge 120 may be coupled to the lower cooking surface 114 of a first slat 110 and also be coupled to both the lower cooking surface 114 and the rear surface 115 of an adjacent slat 110, as is illustrated in FIG. 1B with bridge 120b being coupled to lower cooking surface 114a of slat 110a and also being coupled to both lower cooking surface 114b and rear surface 115b of slat 110b.

A bridge 120 may couple the slats 110 at any angle with regard to each other. For example, the bridge 120 may couple the slats 110 parallel to each other. As another example, the bridge 120 may couple the slats 110 approximately parallel to each other (i.e., parallel +/−2 degrees). Furthermore, a bridge 120 may couple the slats 110 in a spaced-apart relation to each other. In such an example, none of the slats 110 may be touching any of the other slats 110. Furthermore, such a spaced apart relation may create space in-between each adjacent slat 110. The spacing may be any distance. As is illustrated in FIG. 1B, the spacing between adjacent slats 110 may create an upper spacing 161 and a lower spacing 162.

The upper spacing 161 may refer to the spacing in-between the upper cooking surfaces 113 of two adjacent slats 110. For example, the supper spacing 161 may refer to the spacing in-between the upper cooking surface 113a of slat 110a and the upper cooking surface 113b of slat 110b. The upper spacing 161 may be any distance. For example, the upper spacing 161 may be 0.1 inches, 0.2 inches, 0.3 inches, 0.4 inches, 0.5 inches, 0.6 inches, 0.75 inches, 0.8 inches, 0.9 inches, 1 inch, 1.5 inches, or any other distance. As another example, the upper spacing 161 may be approximately (i.e., +/−0.1 inches) 0.1 inches, approximately 0.2 inches, approximately 0.3 inches, approximately 0.4 inches, approximately 0.5 inches, approximately 0.6 inches, approximately 0.75 inches, approximately 0.8 inches, approximately 0.9 inches, approximately 1 inch, approximately 1.5 inches, or any other approximate size. As a further example, the upper spacing 161 may be at least approximately (i.e., +/−0.1 inches) 0.2 inches, at least approximately 0.3 inches, or at least approximately 0.5 inches. As a further example, the upper spacing 161 may be within the range of 0.1 inches-1.5 inches, 0.2 inches-0.75 inches, 0.2 inches-0.5 inches, or any other range. All of the slats 110 may have an upper spacing 161 that is the same size. Alternatively, one or more of the slats 110 may have an upper spacing 161 that is a different size than the other slats 110.

The lower spacing 162 may refer to the spacing in-between the lower cooking surfaces 114 of two adjacent slats 110. For example, the lower spacing 162 may refer to the spacing in-between the lower cooking surface 114a of slat 110a and the lower cooking surface 1146 of slat 1106. The lower spacing 162 may be any distance. For example, the lower spacing 162 may be 0.1 inches, 0.2 inches, 0.3 inches, 0.4 inches, 0.5 inches, 0.6 inches, 0.75 inches, 0.8 inches, 0.9 inches, 1 inch, 1.5 inches, or any other distance. As another example, the lower spacing 162 may be approximately (i.e., +/−0.1 inches) 0.1 inches, approximately 0.2 inches, approximately 0.3 inches, approximately 0.4 inches, approximately 0.5 inches, approximately 0.6 inches, approximately 0.75 inches, approximately 0.8 inches, approximately 0.9 inches, approximately 1 inch, approximately 1.5 inches, or any other approximate size. As a further example, the lower spacing 162 may be at least approximately (i.e., +/−0.1 inches) 0.2 inches, at least approximately 0.3 inches, or at least approximately 0.5 inches. As a further example, the lower spacing 162 may be within the range of 0.1 inches-1.5 inches, 0.2 inches-0.75 inches, 0.2 inches-0.5 inches, or any other range. All of the slats 110 may have a lower spacing 162 that is the same size. Alternatively, one or more of the slats 110 may have a lower spacing 162 that is a different size than the other slats 110.

The lower spacing 162 between two adjacent slats 110 may be the same as the upper spacing 161 between the same two adjacent slats 110. Alternatively, the lower spacing 162 between two adjacent slats 110 may be different than the upper spacing 161 between the same two adjacent slats 110. For example, the lower spacing 162 may be smaller than the upper spacing 161 (with the upper spacing 161 being bigger than the lower spacing 162). As another example, the lower spacing 162 may be bigger than the upper spacing 161 (with the upper spacing 161 being smaller than the lower spacing 162). The difference in the distance of the lower spacing 162 and the upper spacing 161 may be caused by the size difference between the lower width 153 of the lower cooking surface 114 and the upper width 152 of the upper cooking surface 113. For example, as is illustrated in FIG. 1B, the lower width 153 of the lower cooking surface 114 is bigger than the upper width 152 of the upper cooking surface 113. This bigger size of the lower width 153 (in comparison to the upper width 152) causes the spacing in-between the lower cooking surfaces 114 (i.e., the lower spacing 162) to be smaller than the spacing in-between the upper cooking surface 113 (i.e., the upper spacing 161). As such, in such an example, the lower spacing 162 is smaller than the upper spacing 161.

When the lower spacing 162 between two adjacent slats 110 is different than the upper spacing 161 between the same two adjacent slats 110, the difference may allow the food support grate 100 to be used to cook different types of food items. For example, a small spacing in-between adjacent cooking surfaces 114 (such as the smaller lower spacing 162 in-between lower cooking surface 114a and lower cooking surface 114b of FIG. 1B) may allow the cooking surfaces 114 to be used to better (or more easily) cook smaller and/or more fragile food items (such as fish). In such an example, the smaller lower spacing 162 may prevent smaller and/or more fragile food items from falling through the space in-between the lower cooking surfaces 114 (or reduce the amount of smaller food items and/or more fragile food items falling through the space in-between the lower cooking surfaces 114). Furthermore, the smaller lower spacing 162 may cause the food item to receive more heat indirectly through the lower cooking surfaces 114 (as opposed to directly from the heat source of a cooking unit). This may prevent more fragile food items (such as fish) from being burnt by the direct heat source (or reduce the chance of the food items from being burnt by the direct heat source).

As another example, a large spacing in-between adjacent cooking surfaces (such as the bigger upper spacing 161 in-between upper cooking surface 113*a* and upper cooking surface 113*b* of FIG. 1B) may allow the cooking surfaces to be used to better (or more easily) cook bigger and/or more rigid food items (such as steaks). In such an example, the bigger upper spacing 161 may cause the food item to receive more heat by radiation directly from the heat source of a cooking unit (as opposed to indirectly through the upper cooking surfaces 113). Additionally, the large spacing in-between adjacent cooking surfaces may provide an improved air and combustion gas airflow for high efficiency of fuel use and a high cooking temperature, to fully support combustion in which the flow of hot air contributes to the cooking process.

Additionally, when the lower spacing 162 is different than the upper spacing 161, the food support grate 100 may be used to more easily cook different types of food items. For example, to cook bigger and/or more rigid food items (such as steaks), the food support grate 100 may be, for example, positioned in a cooking unit so that the upper cooking surfaces 113 face upward. In such an example, food items may then be positioned on the upper cooking surfaces 113. As another example, to cook smaller and/or more fragile food items (such as fish), the food support grate 100 may be flipped upside down (or inverted) and positioned in the cooking unit so that the bottom portions 121 of the lower cooking surfaces 114 face upward, and the upper cooking surfaces 113 face downward. In such an example, food items may then be positioned on the bottom portions 121 of the lower cooking surfaces 114.

All of the slats 110 may have an upper spacing 161 (and/or a lower spacing 162) that is the same size. Alternatively, one or more of the slats 110 may have an upper spacing 161 (and/or a lower spacing 162) that is a different size than the other slats 110. For example, the upper spacing 161 between two adjacent slats 110 may be large over a first portion of the food support grate 100, and the upper spacing 161 between two adjacent slats 110 may be small over a second portion of the food support grate 100. In such an example, the upper cooking surface 113 may be used to more easily cook different types of food items. In particular, to cook bigger and/or more rigid food items (such as steaks), the food items may be positioned on the upper cooking surfaces 113 in the first portion of the food support grate 100 (with the larger upper spacing 161), and to cook smaller and/or more fragile food items (such as steaks), the food items may be positioned on the upper cooking surfaces 113 in the second portion of the food support grate 100 (with the smaller upper spacing 161). As such, different food types may be cooked without, for example, flipping (or inverting) the food support grate 100.

As illustrated, the food support grate 100 further includes a claw 130. The claw 130 may be any structure that may couple the food support grate 100 into a cooking unit. For example, the claw 130 may be a claw, a hook, a bracket, any other structure that may couple the food support grate 100 into a cooking unit, or any combination of the preceding.

The claw 130 may have any shape for coupling the food support grate 100 into a cooking unit. As is illustrated in FIGS. 1A, 1C, and 1D (and FIG. 2), the claw 130 is shaped generally as a horizontal "T" with a first head 131 extending vertically upward, a second head 132 extending vertically downward, and an abutment 135 extending horizontally. The first head 131 and/or the second head 132 may be inserted into an aperture of the cooking unit (as is discussed below), thereby coupling the food support grate 100 to the cooking unit. The abutment 135 may couple the claw 130 to the slats 110 and/or the bridges 120.

The first head 131 may extend vertically upward to a position above the upper plane 111. This positioning may create a ridge above the upper plane 111. The first head 131 may extend vertically above the upper plane 111 by any distance. For example, the first head 131 may extend vertically above the upper plane 111 by 0.1 inches, 0.2 inches, 0.3 inches, 0.4 inches, 0.5 inches, 0.6 inches, 0.75 inches, 0.8 inches, 0.9 inches, 1 inch, 1.5 inches, 2 inches, 2.5 inches, 3 inches, or any other height. As another example, the first head 131 may extend vertically above the upper plane 111 by approximately (i.e., +/−0.1 inches) 0.1 inches, approximately 0.2 inches, approximately 0.3 inches, approximately 0.4 inches, approximately 0.5 inches, approximately 0.6 inches, approximately 0.75 inches, approximately 0.8 inches, approximately 0.9 inches, approximately 1 inch, approximately 1.5 inches, approximately 2 inches, approximately 2.5 inches, approximately 3 inches, or any other approximate height. The first head 131 may extend vertically upward at any angle with respect to the upper plane 111 and/or lower plane 112. For example, the first head 131 may extend vertically upward at a perpendicular angle (i.e., 90 degrees) to the upper plane 111 and/or lower plane 112, an approximately perpendicular angle (i.e., 90 degrees +/−15 degrees) to the upper plane 111 and/or the lower plane 112, or any other angle.

The second head 132 may extend vertically downward to a position below the lower plane 112. This positioning may create a ridge below the lower plane 112. The second head 132 may extend vertically below the lower plane 112 by any distance. For example, the second head 132 may extend vertically below the lower plane 112 by 0.1 inches, 0.2 inches, 0.3 inches, 0.4 inches, 0.5 inches, 0.6 inches, 0.75 inches, 0.8 inches, 0.9 inches, 1 inch, 1.5 inches, 2 inches, 2.5 inches, 3 inches, or any other height. As another example, the second head 132 may extend vertically below the lower plane 112 by approximately (i.e., +/−0.1 inches) 0.1 inches, approximately 0.2 inches, approximately 0.3 inches, approximately 0.4 inches, approximately 0.5 inches, approximately 0.6 inches, approximately 0.75 inches, approximately 0.8 inches, approximately 0.9 inches, approximately 1 inch, approximately 1.5 inches, approximately 2 inches, approximately 2.5 inches, approximately 3 inches, or any other approximate height. The second head 132 may extend vertically downward at any angle with respect to the upper plane 111 and/or lower plane 112. For example, the second head 132 may extend vertically downward at a perpendicular angle to the upper plane 111 and/or lower plane 112, an approximately perpendicular angle (i.e., 90 degrees +/−15 degrees) to the upper plane 111 and/or the lower plane 112, or any other angle.

As is discussed above, the abutment 135 may couple the claw 130 to either the slats 110, the bridges 120, or both the slats 110 and the bridges 120. To do so, the abutment 135 may be coupled to the slats 110 and/or the bridges 120. The abutment 135 may be coupled to any portion of the slats 110 and/or the bridges 120. For example, the abutment 135 may be coupled to a first end of a slat 110 (e.g., the end extending between the rear side 115 and the front side 116 of the slat 110 and facing out of the paper in FIG. 1B), a second end of a slat 110 (e.g., the end extending between the rear side 115 and the front side 116 of the slat 110 and facing into the paper in FIG. 1B), the rear side 115 of a slat 110, the front side 116 of a slat 110, the upper cooking surface 113 of a slat 110, the lower cooking surface 114 of a slat 110, the top bridge surface 163 of a bridge 120, the bottom bridge surface 164 of a bridge 120, a first bridge end of a bridge 120 (e.g., the end extending between the top bridge surface 164 and the bottom bridge surface 163 and facing out of the paper in FIG. 1B), a second bridge end of a bridge 120 (e.g., the end extending between the top bridge surface 164 and the bottom bridge surface 163 and facing into the paper in FIG. 1B), any other portion of a slat 110 and/or a bridge 120, any other portion of the food support grate 100, or any combination of the preceding. As is illustrated in FIGS. 1A, 1C, and 1D, the abutment 135 is coupled to the second ends of a plurality of slats 110 (e.g., the ends extending between the rear sides 115 and the front sides 116 of the slats 110 and facing into the paper in FIG. 1C) and is further coupled to the second bridge ends of a plurality of bridges 120 (e.g., the ends extending between the top bridge surfaces 164 and the bottom bridge surfaces 163 of the bridges 120 and facing into the paper in FIG. 1C).

The abutment 135 may extend horizontally away from the slats 110 and/or bridges 120. The abutment 135 may extend horizontally away from the slats 110 and/or bridges 120 by any distance. For example, the abutment 135 may extend horizontally away from the slats 110 and/or bridges 120 by 0.1 inches, 0.2 inches, 0.3 inches, 0.4 inches, 0.5 inches, 0.6 inches, 0.75 inches, 0.8 inches, 0.9 inches, 1 inch, 1.5 inches, 2 inches, 2.5 inches, 3 inches, or any other distance. As another example, the abutment 135 may extend horizontally away from the slats 110 and/or bridges 120 by approximately (i.e., +/−0.1 inches) 0.1 inches, approximately 0.2 inches, approximately 0.3 inches, approximately 0.4 inches, approximately 0.5 inches, approximately 0.6 inches, approximately 0.75 inches, approximately 0.8 inches, approximately 0.9 inches, approximately 1 inch, approximately 1.5 inches, approximately 2 inches, approximately 2.5 inches, approximately 3 inches, or any other approximate distance.

The abutment 135 may be coupled to any number of slats 110. For example, the abutment 135 may be coupled to one or more, or all, or none of the slats 110. The abutment 135 may be coupled to any number of bridges 120. For example, the abutment 135 may be coupled to one or more, or all, or none of the bridges 120. The abutment 135 may be coupled to the slats 110 and/or bridges 120 in any manner. For example, the abutment 135 may be bolted to the slats 110 and/or bridges 120, screwed to the slats 110 and/or bridges 120, riveted to the slats 110 and/or bridges 120, clipped or snapped into the slats 110 and/or bridges 120, welded to the slats 110 and/or bridges 120, formed integral with the slats 110 and/or bridges 120, coupled to the slats 110 and/or bridges 120 in any other manner, or any combination of the preceding.

When the claw 130 couples the food support grate 100 into a cooking unit (an example of which is discussed below with regard to FIG. 2), the abutment 135 may position the slats 110 at a downward angle 240. This downward angle 240 may cause the slats 110 to slope downward along the length 150 of the slats 110. By sloping downward, the channels 156 of the slats 110 may also slope downward. In such an example, the fluid collected in the channels 156 may flow downward along the length 150 of the slats 110 toward a fluid collector (as is discussed below with regard to FIG. 2). As such, the fluid may be removed (or drained) from the food support grate 100 in a manner that may prevent the fluids from dripping into a cooking unit (or reducing the amount of fluids that drip into the cooking unit) and causing a flare up.

The downward angle 240 may be any angle below horizontal. For example, the downward angle 240 may be 1 degree below horizontal, 2 degrees below horizontal, 3 degrees below horizontal, 4 degrees below horizontal, 5 degrees below horizontal, 8 degrees below horizontal, 10 degrees below horizontal, 12 degrees below horizontal, 15 degrees below horizontal, 20 degrees below horizontal, 25 degrees below horizontal, or any other angle below horizontal. As another example, the downward angle 240 may be approximately (i.e., +/−1 degree) 1 degree below horizontal, approximately 2 degrees below horizontal, approximately 3 degrees below horizontal, approximately 4 degrees below horizontal, approximately 5 degrees below horizontal, approximately 8 degrees below horizontal, approximately 10 degrees below horizontal, approximately 12 degrees below horizontal, approximately 15 degrees below horizontal, approximately 20 degrees below horizontal, approximately 25 degrees below horizontal, or any other angle below horizontal. As a further example, the downward angle 240 may be at least 2 degrees below horizontal, at least 5 degrees below horizontal, at least 10 degrees below horizontal, at least 15 degrees below horizontal, or at least 20 degrees below horizontal. As another example, the downward angle 240 may be within a range of 1 degree-20 degrees below horizontal, 5 degrees-20 degrees below horizontal, 5 degrees-15 degrees below horizontal, 5 degrees-10 degrees below horizontal, 10 degrees-20 degrees below horizontal, 10 degrees-15 degrees below horizontal, or any other range.

The food support grate 100 may include any number of claws 130. For example, the food support grate 100 may include 1 claw 130, 2 claws 130, 3 claws 130, 4 claws 130, 6 claws 130, or any other number of claws 130. The claws 130 may be positioned at any location with respect to each other. For example, the claws 130 may be positioned on the same side or edge of the food support grate 100, opposing sides or edges of the food support grate 100, on all of the sides or edges of the food support grate 100, or any combination of the preceding.

The claw 130 may be made of (or constructed of) any material. For example, the claw 130 may be made of steel, stainless steel, coated steel, aluminum, iron, brass, titanium, cast iron, any other metal or metal alloy (including coated, plated or clad metals), any other material, or any combination of the preceding. Furthermore, the claw 130 may be coated with one or more layers of porcelain, enamel, any other coating, or any combination of the preceding. The claw 130 may be made of the same material as the slats 110 and/or the bridges 120, or the claw 130 may be made of a different material than the slats 110 and/or the bridges 120.

Modifications, additions, combinations, or omissions may be made to the food support grate 100 without departing from the scope of the disclosure.

Figure 2:
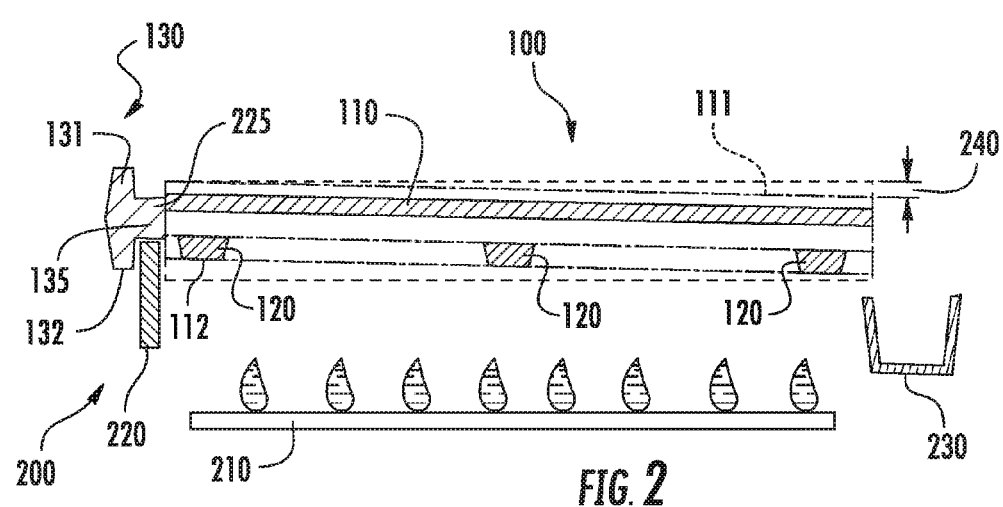
FIG. 2 illustrates an example of the food support grate of FIGS. 1A-1D positioned in a cooking unit.

FIG. 2 illustrates an example of the food support grate of FIGS. 1A-1D positioned in a cooking unit. In particular, FIG. 2 illustrates a side cross-sectional view of a portion of the food support grate 100 taken along section line 2 in FIG. 1B, where the food support grate 100 is positioned in a cooking unit 200.

The food support grate 100 of FIG. 2 may be substantially similar to the food support grate 100 of FIGS. 1A-1D. Furthermore, as is illustrated, the food support grate 100 may be positioned in the cooking unit 200. The cooking unit 200 may be any system for cooking using a grate and/or grill. For example, the cooking unit 200 may be a range, a barbeque, a smoker, a char-broiler, any other system for cooking using a grate and/or grill, or any combination of the preceding. As illustrated, the cooking unit 200 is a char-broiler.

The cooking unit 200 includes a heat source 210 for heating the cooking unit 200. The heat source 200 may be any type of source that generates heat. For example, the heat source 200 may be a gas burner, an electric heater, wood for burning, charcoal for burning, any other type of source that generates heat, or any combination of the preceding. As illustrated, the heat source 210 is a gas burner. The gas burner may generate heat (in the form of a flame) using any type of gas (or fuel). For example, the gas burner may generate the flame using propane, butane, methane, any other ignitable gas, or any combination of the preceding.

The cooking unit 200 further includes a bottom (not illustrated) and one or more sidewalls 220 (e.g., FIG. 2 illustrates only the back sidewall 210) that surround the bottom and extend from the bottom upward, forming a combustion chamber. The sidewalls 220 may extend upward at any upward angle. For example, the sidewalls 220 may extend upward at 30 degrees, 45 degrees, 60 degrees, 75 degrees, 90 degrees, 105 degrees, 120 degrees, or any other upward angle. All of the sidewalls 220 may extend upward at the same angle (e.g., 90 degrees). Alternatively, one or more of the sidewalls 220 may extend upward at a different angle than the other sidewalls 220 (e.g., front and back sidewalls 220 may extend at 90°, and left and right sidewalls 220 may extend at 75 degrees).

One or more of the sidewalls 220 may include an aperture 225. An aperture 225 may be an opening in the sidewall 220 that may allow the claw 130 of the food support grate 100 to be inserted into the aperture 225, so as to couple the food support grate 100 to the cooking unit 200. The aperture 225 may have any size and/or shape for allowing the claw 130 to be inserted into the aperture 225. Once the claw 130 is inserted into the aperture 225, the sidewall 220 may support the weight of the food support grate 100, preventing the food support grate 100 from tipping over into the heat source 210. For example, the first head 131, second head 132, and/or abutment 135 of the claw 130 may apply pressure against the sidewall 220, preventing the food support grate 100 from tipping over into the heat source 210. As is illustrated, the food support grate 100 is inserted into an aperture 225 in the back sidewall 220. In such an example, the back sidewall 220 may support the food support grate 100 in a cantilever suspension over the heat source 210.

Any number of the sidewalls 220 may include an aperture 225 for insertion of a claw 130. For example, 1 sidewall may include an aperture 225, 2 sidewalls may include an aperture 225, 3 sidewalls may include an aperture 225, 4 sidewalls may include an aperture 225, or any other number of sidewalls may include an aperture 225. Additionally, each sidewall 220 may include any number of apertures 225 for insertion of a claw 130. For example, a sidewall 220 may include 1 aperture 225, 2 apertures 225, 3 apertures 225, 4 apertures 225, 5 apertures 225, or any other number of apertures 225.

The cooking unit 200 also includes a fluid collector 230. The fluid collector 230 may be any structure for collecting (and/or receiving) fluids (such as grease, fat, etc.) that drip from food items being cooked on the food support grate 100. For example, the fluid collector 230 may be a trough, a bowel, a container, any other structure for collecting (and/or receiving) fluids that drip from food items being cooked on the food support grate 100, or any combination of the preceding. As illustrated, the fluid collector 230 is a trough.

The fluid collector 230 may have any shape. Furthermore, the fluid collector 230 may have any size. As an example, the fluid collector 230 may have a length that is equal to the overall width 151 of the food support grate 100. In such an example, the fluid collector 230 may be able to collect (and/or receive) fluid from all of the channels 156 of the food support grate 100.

The fluid collector 230 may be coupled to any portion of the cooking unit 200 that allows the fluid collector 230 to collect (and/or receive) fluid from the channels 156. For example, when the channels 156 are oriented to direct fluid from the back of the cooking unit 200 to the front of the cooking unit 200, the fluid collector 230 may be coupled to the front of the cooking unit 200. As another example, when the channels 156 are oriented to direct fluid from the front of the cooking unit 200 to the back of the cooking unit 200, the fluid collector 230 may be coupled to the back of the cooking unit 200. As a further example, when the channels 156 are oriented to direct fluid from the right side of the cooking unit 200 to the left side of the cooking unit 200, the fluid collector 230 may be coupled to the left side of the cooking unit 200. As another example, when the channels 156 are oriented to direct fluid from the left side of the cooking unit 200 to the right side of the cooking unit 200, the fluid collector 230 may be coupled to the right side of the cooking unit 200. As is illustrated, the channels 156 of the food support grate 100 are oriented to direct fluid from the back of the cooking unit 200 to the front of the cooking unit 200, and the fluid collector 230 is coupled to the front of the cooking unit 200.

The fluid collector 230 may be at least temporarily coupled to the cooking unit 200 in any manner. For example, the fluid collector 230 may be bolted to the cooking unit 200, screwed to the cooking unit 200, riveted to the cooking unit 200, clipped or snapped into the cooking unit 200, welded to the cooking unit 200, formed integral with the cooking unit 200, coupled to the cooking unit 200 in any other manner, or any combination of the preceding. In one example, the fluid collector 230 is preferably removable from the cooking unit 200 for cleaning. Additionally, in one example, the fluid collector 230 preferably rests on a support structure (not illustrated), such as a track or bracket. Furthermore, the cooking unit 200 may include any number of fluid collectors 230. For example, the cooking unit 200 may include 1 fluid collector 230, 2 fluid collectors 230, 3 fluid collectors 230, 5 fluid collector 230, or any other number of fluid collectors 230.

As is discussed above, the food support grate 100 may be positioned in the cooking unit 100. When positioned in the cooking unit 200, the food support grate 100 may have any orientation. For example, the food support grate 100 may be oriented in the cooking unit 200 so that the upper cooking surfaces 113 face upward. In such an example, food items may then be positioned on the upper cooking surfaces 113. As another example, the food support grate 100 may be flipped upside down (or inverted) and positioned in the cooking unit 200 so that the bottom portions 121 of the lower cooking surfaces 114 face upward, and the upper cooking surfaces 113 face downward. In such an example, food items may then be positioned on the bottom portions 121 of the lower cooking surfaces 114. Furthermore, a user of the food support grate 100 may change the orientation of the food support grate 100. For example, a user may cook food with the food support grate 100 in the first orientation, and then the user may remove the food support grate 100, flip the food support grate 100 upside down (or inverted), re-position the food support grate 100 in the cooking unit 200 in the second orientation, and then cook food with the food support grate 100 in the second orientation (or vice versa). As is illustrated in FIG. 2, the food support grate 100 is oriented in the cooking unit 200 so that the upper cooking surfaces 113 face upward. Such an orientation may allow bigger and/or more rigid food items (such as steaks) to be better (or more easily) cooked, as is discussed above.

Additionally, such an orientation may further allow fluid from food items to drip into the channels 156, flow along the length 150 of the channels 156, and flow out of the slat 110 into the fluid collector 230. As such, the fluid may be removed (or drained) from the food support grate 100 in a manner that may prevent the fluids from dripping into a cooking unit (or reducing the amount of fluids that drip into the cooking unit) and causing a flare up. In order to assist the fluid in flowing along the length 150 of the channels 156, out of the slat 110, and into the fluid collector 230, the slats 110 (and therefore the channels 156) may be positioned at a downward angle 240. This downward angle 240 may cause the slats 110 (and therefore the channels 156) to slope downward along the length 150 of the slats 110. In such an example, the fluid collected in the channels 156 may flow downward along the length 150 of the slats 110 toward the fluid collector 230, flow out of the slat 110, and flow into the fluid collector 230. As such, the fluid may be removed (or drained) from the food support grate 100 in a manner that may prevent the fluids from dripping into a cooking unit (or reducing the amount of fluids that drip into the cooking unit) and causing a flare up.

As is discussed above, the downward angle 240 may be any angle below horizontal. In one example, the downward angle 240 is preferably approximately 10 degrees below horizontal. As is also discussed above, the abutment 135 may position the slats 110 at the downward angle 240. Alternatively (or additionally), the downward angle 240 may be provided in any other manner. For example, the sidewalls 220 (in which the claw 130 is inserted) may be slanted, causing the slats 110 to be positioned at the downward angle 240. As another example, the channels 156 (themselves) may be formed at the downward angle 240. In such an example, the height of the lower apex 125 of a channel 156 may decrease along the length 150 of the slat 110, causing the channel 156 to tilt downward at the downward angle 240. Furthermore, in such an example, the upper cooking surfaces 113 of the slats 110 may be positioned horizontally (or approximately horizontally (i.e., horizontal +/−5 degrees)) while positioned in the cooking unit 200, instead of being positioned at the downward angle 240.

Figure 3A:
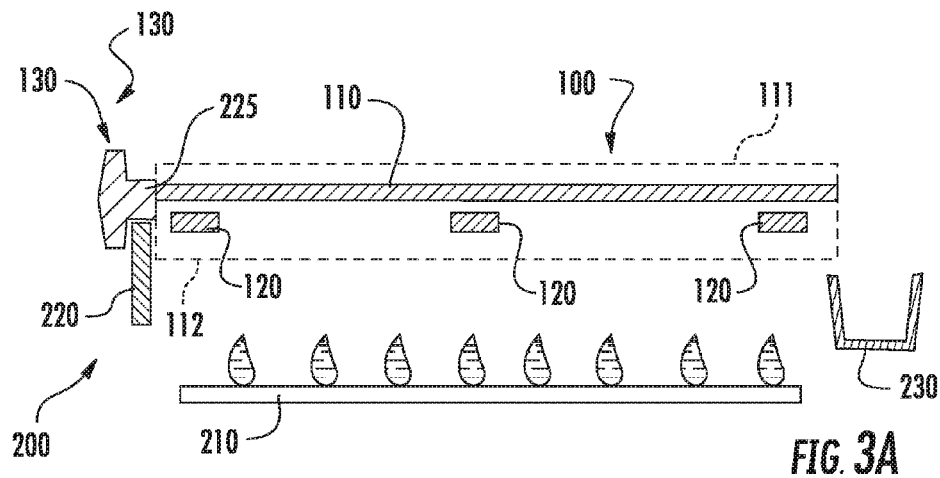
FIGS. 3A-3B illustrate another example of the food support grate of FIGS. 1A-1D positioned in a cooking unit.
Figure 3B:
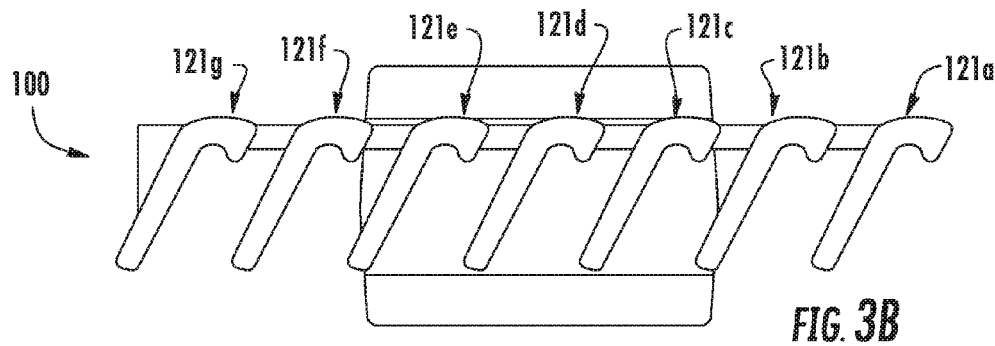

FIGS. 3A-3B illustrate another example of the food support grate of FIGS. 1A-1D positioned in a cooking unit. In particular, FIG. 3A illustrates a side cross-sectional view of a portion of the food support grate 100 taken along section line 2 in FIG. 1B, where the food support grate 100 is positioned in a cooking unit 200; and FIG. 3B illustrates a front view of the food support grate 100 of FIG. 3A.

The food support grate 100 of FIGS. 3A-3B may be substantially similar to the food support grate 100 of FIGS. 1A-2, and the cooking unit 200 of FIGS. 3A-3B may be substantially similar to the cooking unit 200 of FIG. 2. However, unlike the food support grate 100 of FIG. 2, the food support grate 100 of FIG. 3A-3B is flipped upside down (or inverted) and positioned in the cooking unit so that the bottom portions 121 of the lower cooking surfaces 114 face upward, and the upper cooking surfaces 113 face downward. In such an orientation, food items may be positioned on the bottom portions 121 of the lower cooking surfaces 114. Furthermore, such an orientation may allow smaller and/or more fragile food items (such as fish) to be better (or more easily) cooked, as is discussed above. Also, such an orientation may cause the channels 156 to face downward. As such, in this orientation, the channels 156 are not intended to collect fluid or direct the fluid to the fluid collector 230.

FIG. 4 illustrate another example food support grate. In particular, FIG. 4 illustrates a cross-sectional view of a portion of another example food support grate 100 taken at section line 1D of FIG. 1B. The food support grate 100 of FIG. 4 may be substantially similar to the food support grate 100 of FIGS. 1A-1D. However, the bridges 120 of the food support grate 100 of FIG. 4 are positioned in staggered rows, as opposed to being positioned in straight rows (as is illustrated in FIG. 1D).

Figure 5:
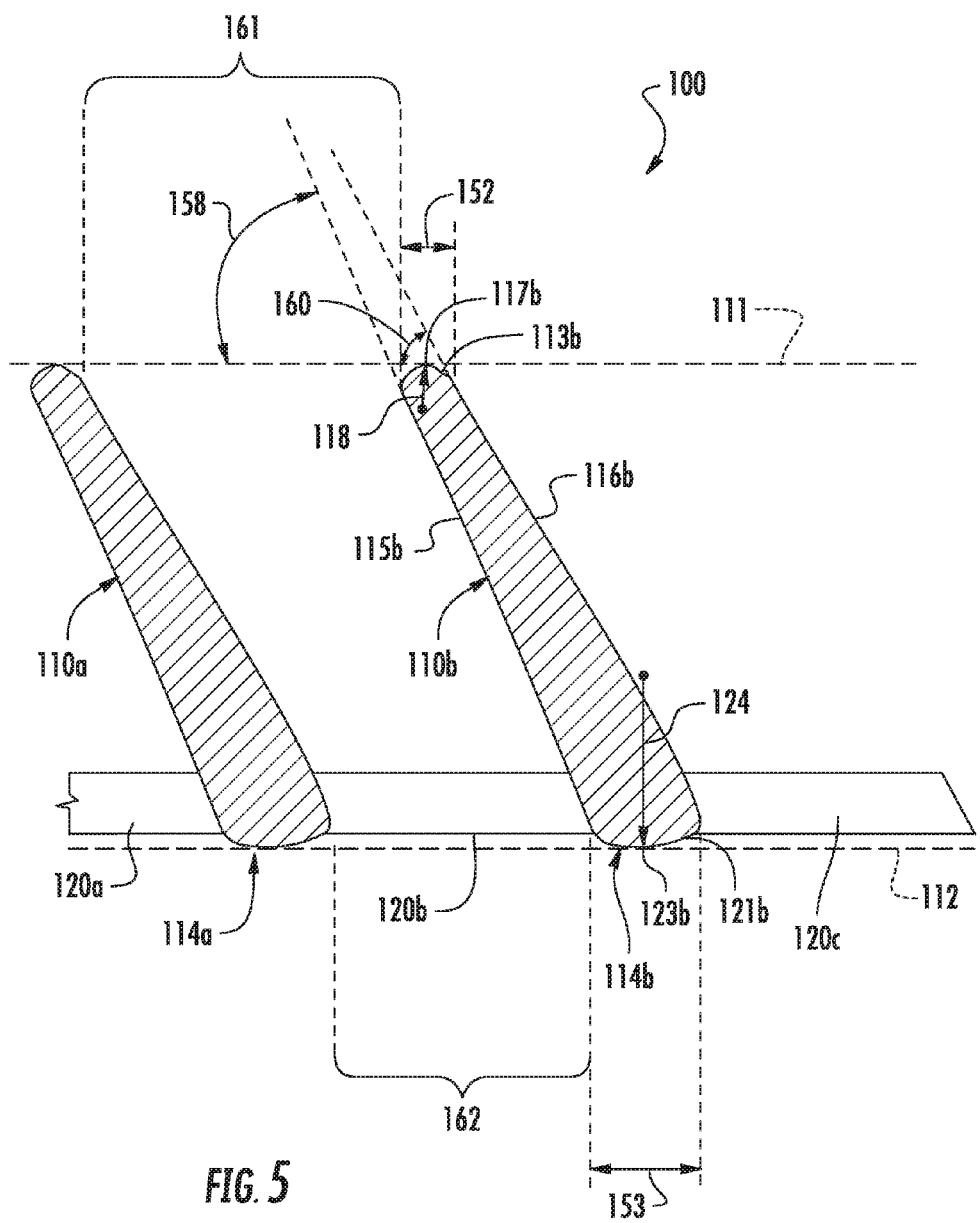
FIG. 5 illustrates another example of slats of a food support grate.

FIG. 5 illustrates another example of slats of a food support grate. In particular, FIG. 5 illustrates a cross-sectional view of a portion of the food support grate 100 having slats 110. Food support grate 100 of FIG. 5 may be substantially similar to the food support grate 100 of FIGS. 1A-1D. Furthermore, the slats 110 of FIG. 5 may be substantially similar to the slats 110 of FIGS. 1A-1D and have substantially similar dimensions to the slats 110 of FIGS. 1A-1D. However, the slats 110 of FIG. 5 have a different shape than the slats 110 of the food support grate 100 of FIGS. 1A-1D. For example, as is illustrated, the slats 110 are shaped as a wedge.

Also, the lower cooking surface 114 of the slats 110 of FIG. 5 includes a bottom portion 121, but (unlike the slats 110 of FIGS. 1A-1D) does not include a top portion 122 or a channel 156. As such, the slats 110 of FIG. 5 would not collect fluids dripping from food items, or direct the collected fluids away from the heat source of the cooking unit, for example.

The upper cooking surface 113 of the slats 110 of FIG. 5 has an upper width 152 that is smaller than the lower width 153 of the lower cooking surface 114. As such, a user may cook larger food items, for example, on the upper cooking surface 113, and may cook smaller food items (and/or fragile food items) on the lower cooking surface 114. It should also be appreciated that to provide a larger width 153 on the lower cooking surface 114, the rear side 115 and the front side 116 may not be parallel to each other. In such an example, the rear side 115 may be positioned at a rear oblique angle 158 that is different than the front oblique angle 160 that the front side 116 is positioned at. In particular, the front oblique angle 160 may be smaller than the rear oblique angle 158. In one example, the front oblique angle 160 is preferably smaller than approximately ½ of the rear oblique angle 158 (i.e., ½+/−⅛).

Furthermore, the lower cooking surface 114 has a lower apex 121 that has a second radius of curvature 124 that may be bigger than the first radius of curvature 118 of the upper apex 117 of the upper cooking surface 113. The bigger radius of curvature of the lower apex 123 of the lower cooking surface 114 may allow one or more instruments (such as a spatula) to more easily fit underneath the food items being cooked on the lower cooking surface 114, for example. Additionally, the smaller radius of curvature of the upper apex 117 of the upper cooking surface 113 may allow the upper cooking surface 113 to create more prominent or intense grill lines in the food items being cooked on the upper cooking surface 113, for example.

Figure 6:
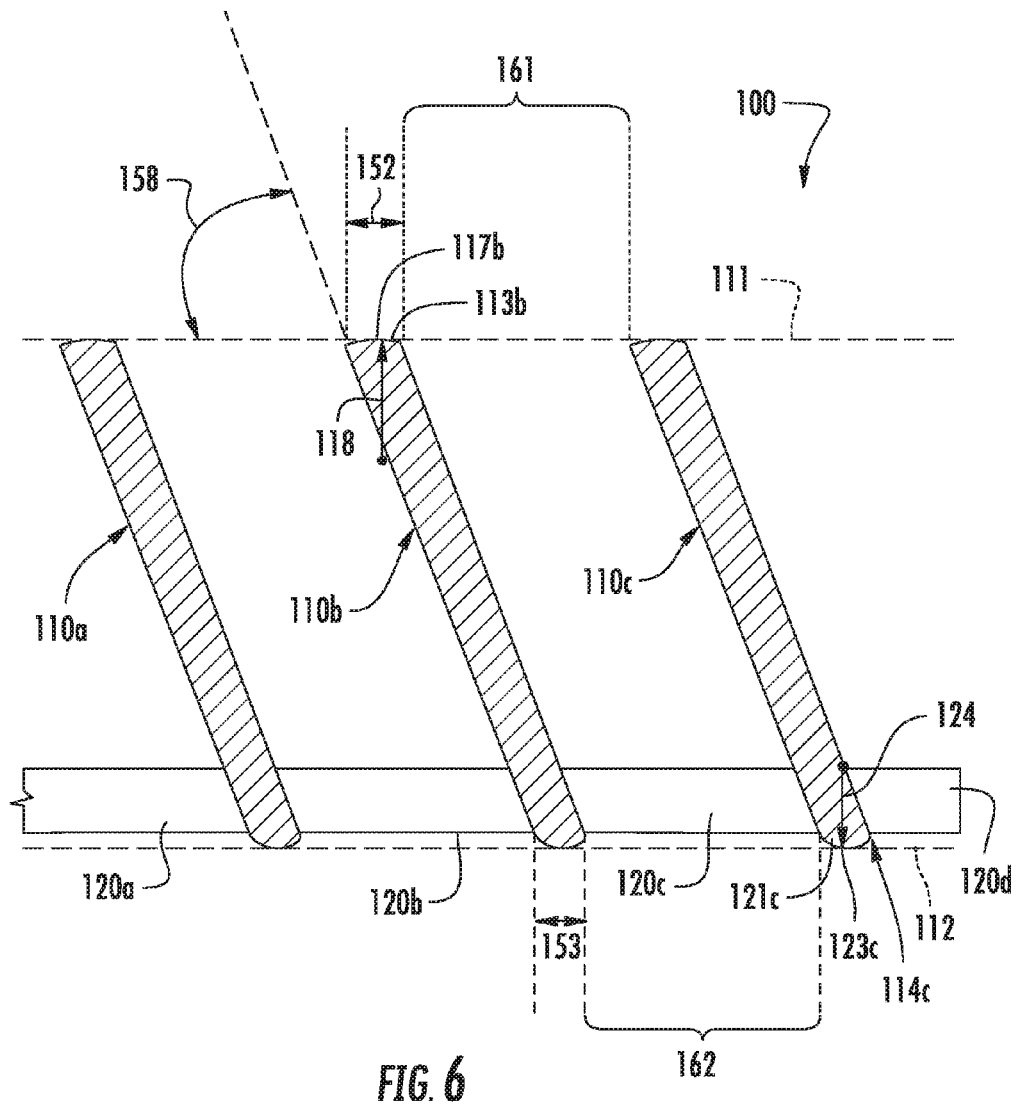
FIG. 6 illustrates a further example of slats of a food support grate.

FIG. 6 illustrates a further example of slats of a food support grate. In particular, FIG. 6 illustrates a cross-sectional view of a portion of the food support grate 100 having slats 110. Food support grate 100 of FIG. 6 may be substantially similar to the food support grate 100 of FIGS. 1A-1D and 5. Furthermore, the slats 110 of FIG. 6 may be substantially similar to the slats 110 of FIGS. 1A-1D and 5, and have substantially similar dimensions to the slats 110 of FIGS. 1A-1D and 5. However, the slats 110 of FIG. 5 have a different shape than the slats 110 of the food support grate 100 of FIGS. 1A-1D and 5. For example, as is illustrated, the slats 110 are shaped as a straight rod.

The upper cooking surface 113 of the slats 110 of FIG. 6 has an upper width 152 that is equal to (or approximately equal to) the lower width 153 of the lower cooking surface 114. Furthermore, the lower cooking surface 114 has a lower apex 121 that has a second radius of curvature 124 that may be bigger than the first radius of curvature 118 of the upper apex 117 of the upper cooking surface 113. The bigger radius of curvature of the lower apex 123 of the lower cooking surface 114 may allow one or more instruments (such as a spatula) to more easily fit underneath the food items being cooked on the lower cooking surface 114, for example. Additionally, the smaller radius of curvature of the upper apex 117 of the upper cooking surface 113 may allow the upper cooking surface 113 to create grill lines in the food items being cooked on the upper cooking surface 113, for example. Additionally, the upper spacing 161 between adjacent slats 110 of FIG. 6 is equal (or approximately equal) to the lower spacing 162 between adjacent slats 110 of FIG. 6.

The lower cooking surface 114 of the slats 110 of FIG. 6 includes a bottom portion 121, but (unlike the slats 110 of FIGS. 1A-1D, and similar to the slats 110 of FIG. 5) does not include a top portion 122 or a channel 156. As such, the slats 110 of FIG. 6 would not collect fluids dripping from food items, or direct the collected fluids away from the heat source of the cooking unit, for example.

Figure 7:
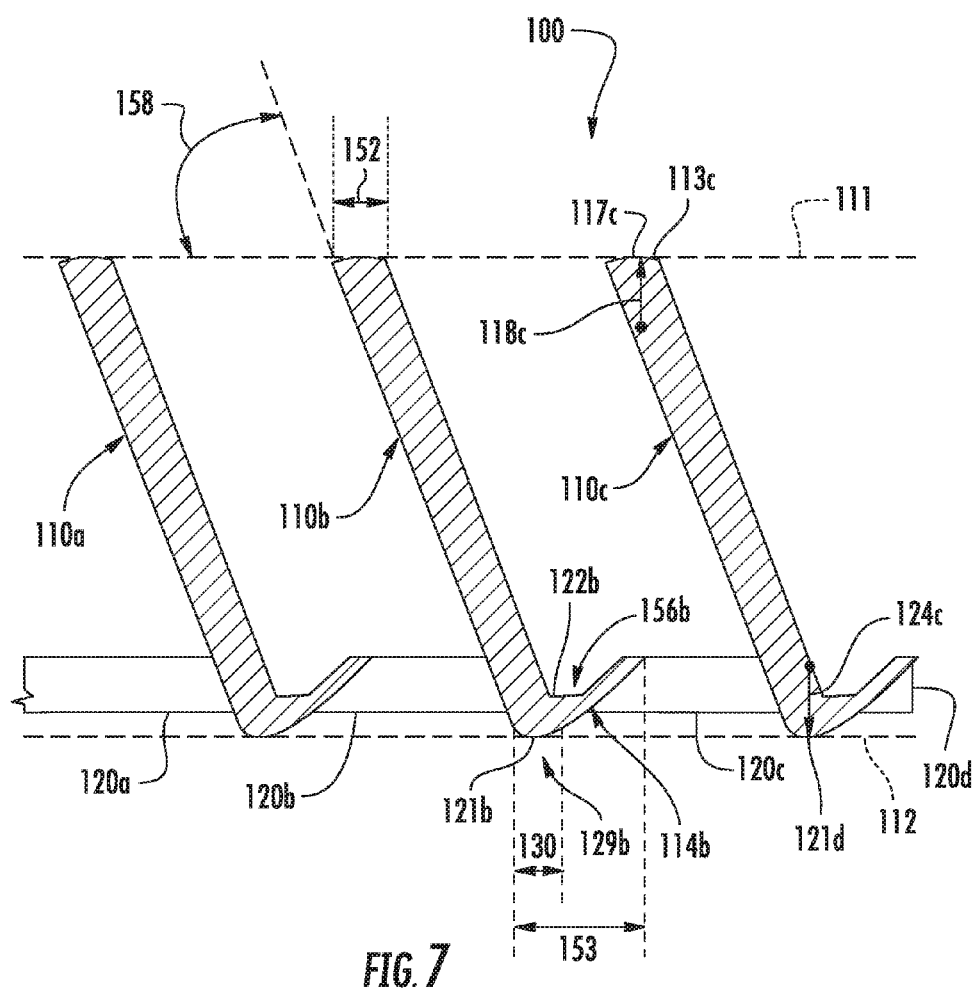
FIG. 7 illustrates a further example of slats of a food support grate.

FIG. 7 illustrates a further example of slats of a food support grate. In particular, FIG. 7 illustrates a cross-sectional view of a portion of the food support grate 100 having slats 110. Food support grate 100 of FIG. 7 may be substantially similar to the food support grate 100 of FIGS. 1A-1D and 5-6. Furthermore, the slats 110 of FIG. 7 may be substantially similar to the slats 110 of FIGS. 1A-1D and 5-6, and have substantially similar dimensions to the slats 110 of FIGS. 1A-1D and 5-6. However, the slats 110 of FIG. 7 have a different shape than the slats 110 of the food support grate 100 of FIGS. 1A-1D and 5-6. For example, the lower cooking surface 114 of the slats 110 of FIG. 7 includes a bottom portion 121 that has a bottom food support portion 129 (such as bottom food support portion 129b). The bottom food support portion 129 is a portion of the bottom portion 121 that may support (or otherwise touch) food items when the food items are positioned on the lower cooking surface 114. In such an example, the remainder of the bottom portion 121 may not support (or otherwise touch) food items when the food items are positioned on the lower cooking surface 114, as a result of the remainder of the bottom portion 121 curving away from the bottom food support portion 129 and any potential food items, as is illustrated in FIG. 7.

The bottom food support portion 129 has a bottom food support portion width 130. The bottom food support portion width 130 is equal to (or approximately equal to) the upper width 152 of the upper cooking surface 113. Additionally, the bottom food support portion width 130 is smaller than the lower width 153. The bottom food support portion 129 also has a lower apex 121 that has a second radius of curvature 124 that may be equal (or approximately equal) to the first radius of curvature 118 of the upper apex 117 of the upper cooking surface 112.

Additionally, similar to slats 110 of FIGS. 1A-1D, slats 110 of FIG. 7 have a top portion 122 and a channel 156. As such, the slats 110 of FIG. 7 may collect fluids dripping from food items, and then direct the collected fluids away from the heat source of the cooking unit. Furthermore, the bottom portion 121 of slats 110 may have a convex shape, and the top portion 122 may have a concave portion that defines the channel 156.

Figure 8:
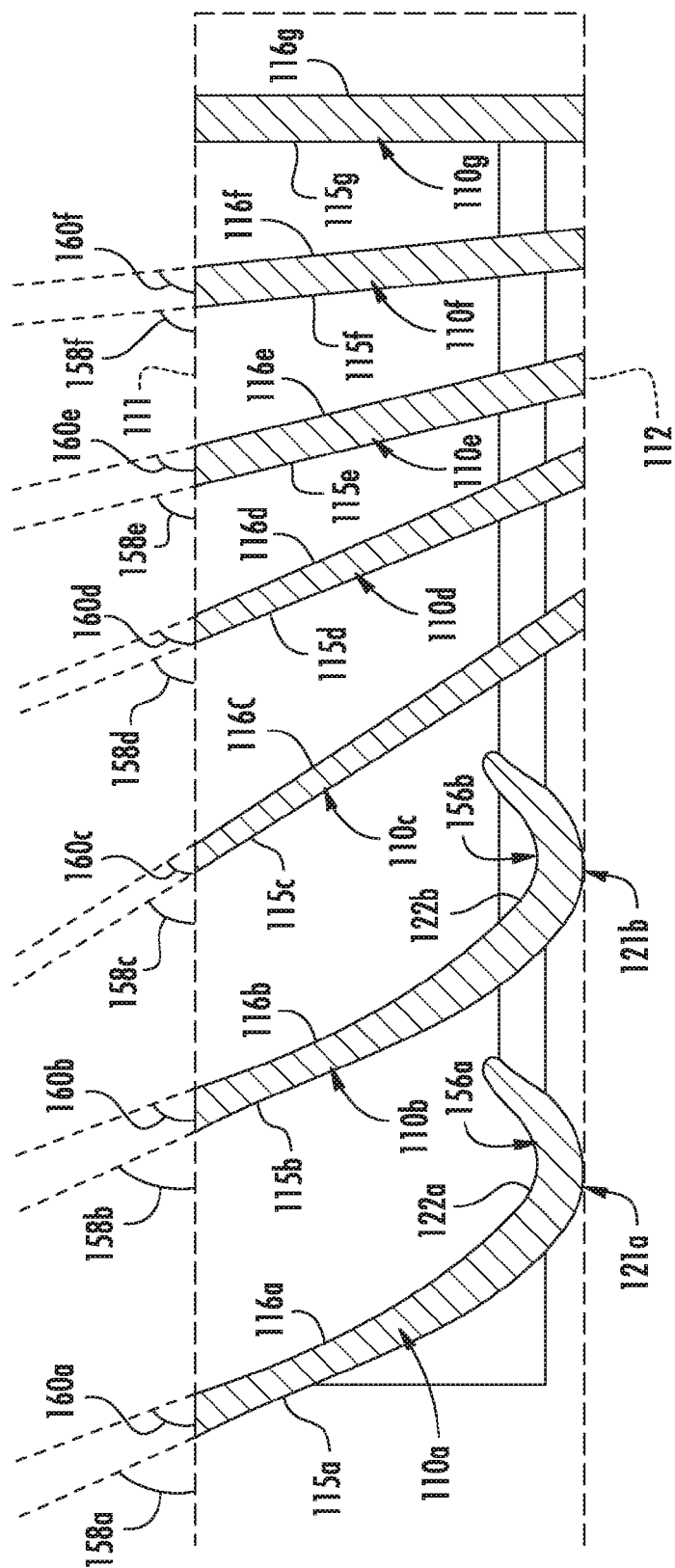
FIG. 8 illustrates a further example of slats of a food support grate.

FIG. 8 illustrates a further example of slats of a food support grate. In particular, FIG. 8 illustrates a cross-sectional view of a portion of the food support grate 100 having slats 110. Food support grate 100 of FIG. 8 may be substantially similar to the food support grate 100 of FIGS. 1A-1D and 5-7. Furthermore, the slats 110 of FIG. 8 may be substantially similar to the slats 110 of FIGS. 1A-1D and 5-7, and have substantially similar dimensions to the slats 110 of FIGS. 1A-1D and 5-7. However, unlike the illustrated slats 110 of FIGS. 1A-1D and 5-7, one or more of the slats 110 of FIG. 8 may have a different shape than other slats 110 of FIG. 8. That is, the shapes of slats 110 of FIG. 8 may vary. For example, as illustrated, slats 110a and 110b are each shaped as a "J". Additionally, slats 110c-110g are each shaped as non-"J" shape, such as a wedge or a straight rod. Any number of slats 110 of FIG. 8 may be shaped as a "J", and any number of slats 110 of FIG. 8 may have a non-"J" shape.

The slats 110a and 110b of FIG. 8 each have a top portion 122 (e.g., 122a-122b) and a channel 156 (e.g., 156a-156b). As such, the slats 110a and 110b of FIG. 8 may collect fluids dripping from food items, and then direct the collected fluids away from the heat source of the cooking unit. Furthermore, the bottom portion 121 (e.g., 121a-121b) of slats 110a and 110b may have a convex shape, and the top portion 122 may have a concave portion that defines the channel 156. The slats 110c-110g of FIG. 8 do not have a top portion 122. As such, the slats 110c-110g of FIG. 8 would not collect fluids dripping from food items, for example.

As illustrated, the slats 110 of FIG. 8 have a rear side 115 (e.g., 115a-115g) and a front side 116 (e.g., 116a-116g) that may be positioned at a rear oblique angle 158 (e.g., 158a-158f) and/or a front oblique angle 160 (e.g., 160a-160f) to the upper plane 111 and/or the lower plane 112. One or more of the slats 110 of FIG. 8 may have a rear oblique angle 158 (and/or front oblique angle 160) that is a different angle than the other slats 110 of FIG. 8. That is, the rear oblique angles 158 (and/or front oblique angles 160) may vary. For example, as illustrated, slats 110a and 110b each have a rear oblique angle 158 that is the same angle, and a front oblique angle 160 that is the same angle. Furthermore, slat 110c has a rear oblique angle 158c that is smaller than the rear oblique angles 158 of slats 110a and 110b, and a front oblique angle 160c that is smaller than the front oblique angles 160 of slats 110a and 110b. Slat 110d has a rear oblique angle 158d that is bigger than the rear oblique angle 158c of slat 110c, and a front oblique angle 160d that is bigger than the front oblique angle 160c of slat 110c. Slat 110e has a rear oblique angle 158e that is bigger than the rear oblique angle 158d of slat 110d, and a front oblique angle 160e that is bigger than the front oblique angle 160d of slat 110d. Slat 110f has a rear oblique angle 158f that is bigger than the rear oblique angle 158e of slat 110e, and a front oblique angle 160f that is bigger than the front oblique angle 160e of slat 110e. Finally, slat 110g does not have a rear oblique angle 158 or a front oblique angle 160, as the rear side 115g (and/or front side 116g) is positioned at a 90 degree angle to the upper plane 111 and/or the lower plane 112.

Modifications, additions, combinations, or omissions may be made to the food support grates 100, slats 110, and/or any other elements of FIGS. 1A-8 without departing from the scope of the disclosure. Additionally, any of the elements of any of FIGS. 1A-8 may be added to, combined with, or substituted for any of the elements of any other of the FIGS. 1A-8.

Figure 9:
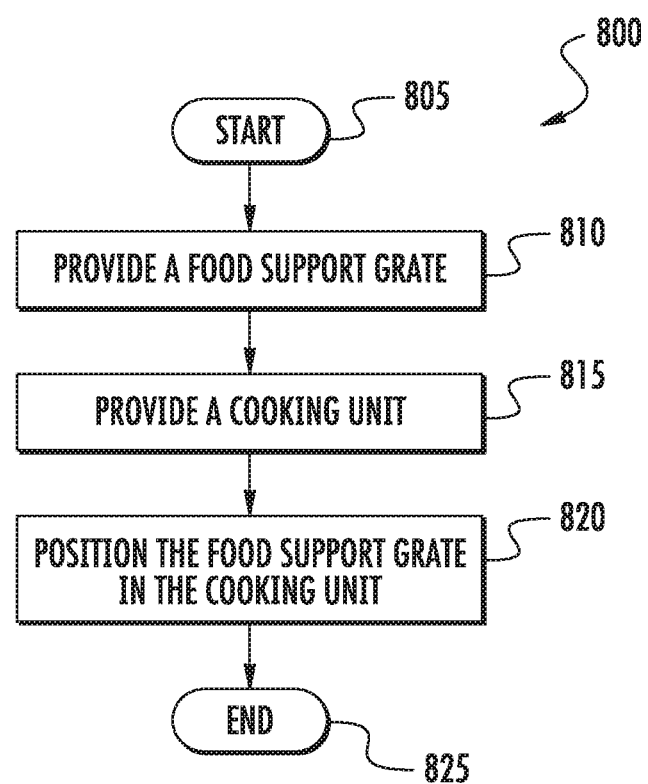
FIG. 9 illustrates an example method for installing and/or using a food support grate.

FIG. 9 illustrates an example method of installing and/or using a food support grate. One or more of the steps (such as all of the steps) of method 800 may be performed using the food support grate 100 of FIGS. 1A-8, the cooking unit 200 of FIGS. 2-3B, and/or any of the other elements of FIGS. 1A-8. Furthermore, one or more of the steps (such as all of the steps) of method 800 may be performed by a manufacturer of a food support grate, a re-seller of a food support grate, a shipper of a food support grate, an installer of a food support grate, and/or a user of a food support grate. Additionally, one or more of the steps of method 800 may be performed by different entities.

The method 800 begins at step 805. At step 810, a food support grate may be provided. The food support grate may be any of the food support grates 100 of FIGS. 1-8, or any other food support grate. The food support grate may be provided in any manner. For example, the food support grate may be built, purchased, shipped, acquired, received, provided in any other manner, or any combination of the preceding.

At step 815, a cooking unit may be provided. The cooking unit may be any of the cooking units 200 of FIGS. 2-3B, or any other cooking unit. The cooking unit may be provided in any manner. For example, the cooking unit may be built, purchased, shipped, acquired, received, installed, provided in any other manner, or any combination of the preceding.

At step 820, the food support grate may be positioned in the cooking unit. The food support grate may be positioned in the cooking unit in any manner. For example, a claw 130 of the food support grate 100 may be inserted into an aperture 225 of a sidewall 220 of the cooking unit 200, so as to couple the food support grate 100 to the cooking unit 200. When positioned in the cooking unit, the food support grate may have any orientation. For example, the food support grate may be oriented so that the upper cooking surfaces 113 of the slats 110 of the food support grate 100 face upward. As another example, the food support grate may be oriented so that the bottom portions 121 of the lower cooing surfaces 114 of the slats 110 of the food support grate 100 face upward, and the upper cooking surfaces 113 of the slats 110 of the food support grate 100 face downward. Furthermore, a user of the food support grate may change the orientation of the food support grate. For example, a user may cook food with the food support grate 100 in the first orientation, and then the user may remove the food support grate 100, flip the food support grate 100 upside down (or inverted), re-position the food support grate 100 in the cooking unit 200 in the second orientation, and then cook food with the food support grate 100 in the second orientation (or vice versa). At step 825, the method 800 ends.

Modifications, additions, or omissions may be made to method 800. For example, the method 800 may not include one or more of the steps. Additionally, the steps of method 800 may be performed in parallel or in any suitable order.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A food support grate, comprising:
    a plurality of slats positioned parallel and in a spaced-apart relation to each other, each of the plurality of slats having:
        an upper cooking surface having an upper apex with a first radius of curvature;
        a lower cooking surface having a lower apex with a second radius of curvature, wherein the first radius of curvature is smaller than the second radius of curvature;
        a rear side that extends from the upper cooking surface to the lower cooking surface; and
        a front side;
    a plurality of bridges that each couple two or more adjacent slats of the plurality of slats to each other;
    wherein the upper apexes of the plurality of slats define an upper plane and the lower apexes of the plurality of slats define a lower plane;
    wherein the rear sides and the front sides of the plurality of slats each have a portion positioned at an oblique angle with respect to one of the upper and lower planes;
    wherein the lower cooking surface of each of the plurality of slats has a convex shape on a bottom portion of the lower cooking surface, and further has a concave shape on a top portion of the lower cooking surface, wherein each of the concave shapes on the top portions of the lower cooking surfaces of the plurality of slats define a channel along the length of the respective slat of the plurality of slats; and
    wherein the food support grate is configured to be positioned in a cooking unit with the upper cooking surfaces facing upward, and further configured to be positioned in the cooking unit with the lower cooking surfaces facing upward and the upper cooking surfaces facing downward.

2. A food support grate, comprising:
    a plurality of slats positioned parallel and in a spaced-apart relation to each other, each of the plurality of slats having:
        an upper cooking surface having an upper apex;
        a lower cooking surface having a lower apex;
        a rear side that extends from the upper cooking surface to the lower cooking surface; and
        a front side opposite the rear side;
    a plurality of bridges that each couple two or more adjacent slats of the plurality of slats to each other;
    wherein the upper apexes of the plurality of slats define an upper plane and the lower apexes of the plurality of slats define a lower plane;
    wherein the rear sides and the front sides of the plurality of slats each have a portion positioned at an oblique angle with respect to one of the upper and lower planes;

wherein the upper apex of each of the plurality of slats has a first radius of curvature, and the lower apex of each of the plurality of slats has a second radius of curvature, wherein the first radius of curvature is smaller than the second radius of curvature;

wherein the food support grate is configured to be positioned in a cooking unit with the upper cooking surfaces facing upward; and wherein the food support grate is further configured to be positioned in the cooking unit with the lower cooking surfaces facing upward and the upper cooking surfaces facing downward.

3. The food support grate of claim 2, wherein the lower cooking surface of each of at least a portion of the plurality of slats has a convex shape on a bottom portion of the lower cooking surface, and further has a concave shape on a top portion of the lower cooking surface, and further wherein each of the concave shapes on the top portions of the lower cooking surfaces of the at least the portion of the plurality of slats define a channel along a length of the respective slat of the at least the portion of the plurality of slats.

4. The food support grate of claim 3, wherein the channel is configured to collect fluid draining down the front side of the respective slat.

5. The food support grate of claim 2, wherein the at least the portion of the plurality of slats comprises all of the plurality of slats.

6. The food support grate of claim 3, wherein each of the plurality of slats is spaced apart from a respective adjacent slat so that the channel of the respective adjacent slat is disposed to receive fluid dripping downward from the upper cooking surface of the each of the plurality of slats.

7. The food support grate of claim 3, wherein the front sides of the plurality of slats are each positioned at a slope having a slope width, and wherein the channels of the at least the portion of the plurality of slats each have a channel width having a size of 50%-200% of a size of a respective slope width.

8. The food support grate of claim 2, wherein the upper cooking surface of each of at least a second portion of the plurality of slats has a width that is smaller than a width of the respective lower cooking surface.

9. The food support grate of claim 2, wherein the upper plane is parallel to the lower plane.

10. The food support grate of claim 2, wherein the plurality of slats are each shaped as a "J".

11. A food support grate, comprising:
a plurality of slats positioned parallel and in a spaced-apart relation to each other, each of the plurality of slats having:
an upper cooking surface having an upper apex;
a lower cooking surface having a lower apex;
a rear side that extends from the upper cooking surface to the lower cooking surface; and
a front side;
a plurality of bridges that each couple two or more adjacent slats of the plurality of slats to each other, each bridge having an upper bridge surface and a lower bridge surface;
wherein the upper apexes of the plurality of slats define an upper plane and the lower apexes of the plurality of slats define a lower plane;
wherein the upper bridge surfaces and lower bridge surfaces of the plurality of bridges are positioned within the upper plane and the lower plane;

wherein the upper cooking surface of each of at least a portion of the plurality of slats has a width that is smaller than a width of the respective lower cooking surface;

wherein the rear sides and the front sides of the plurality of slats each have a portion positioned at an oblique angle with respect to one of the upper and lower planes;

wherein the food support grate is configured to be positioned in a cooking unit with the upper cooking surfaces facing upward; and wherein the food support grate is further configured to be positioned in the cooking unit with the lower cooking surfaces facing upward and the upper cooking surfaces facing downward.

12. The food support grate of claim 11, wherein the at least the portion of the plurality of slats comprises all of the plurality of slats.

13. A food support grate, comprising:
a plurality of slats positioned in a spaced-apart relation to each other, each of the plurality of slats having:
an upper cooking surface having an upper apex;
a lower cooking surface having a lower apex;
a rear side that extends from the upper cooking surface to the lower cooking surface; and
a front side;
a plurality of bridges that each couple two or more adjacent slats of the plurality of slats to each other;
wherein the upper apexes of the plurality of slats define an upper plane and the lower apexes of the plurality of slats define a lower plane;
wherein the rear sides and the front sides of the plurality of slats each have a portion positioned at an oblique angle with respect to one of the upper and lower planes;
wherein the lower cooking surface of each of at least a portion of the plurality of slats includes a channel along a length of the respective slat of the at least the portion of the plurality of slats, the channel being configured to collect fluid draining down the front side of the respective slat;
wherein the food support grate is configured to be positioned in a cooking unit with the upper cooking surfaces facing upward; and
wherein the food support grate is further configured to be positioned in the cooking unit with the lower cooking surfaces facing upward and the upper cooking surfaces facing downward.

14. The food support grate of claim 13, wherein the rear sides and the front sides of the plurality of slats each have a portion positioned at an oblique angle with respect to one of the upper and lower planes.

15. The food support grate of claim 14, wherein the oblique angle of a first slat of the plurality of slats is different than the oblique angle of a second slat of the plurality of slats.

16. The food support grate of claim 14, wherein the front sides of the plurality of slats are each positioned at a slope having a slope width, and wherein the channels of the at least the portion of the plurality of slats each have a channel width having a size of 50%-200% of a size of a respective slope width.

17. The food support grate of claim 13, wherein each of the plurality of slats is spaced apart from a respective adjacent slat so that the channel of the respective adjacent slat is disposed to receive fluid dripping downward from the upper cooking surface of the each of the plurality of slats.

18. The food support grate of claim 17, wherein a first slat of the plurality of slats is spaced apart from a first adjacent slat by a first distance, a second slat of the plurality of slats is spaced apart from a second adjacent slat by a second distance, and the first distance is different than the second distance.

19. The food support grate of claim 13, further comprising a claw configured to couple the food support grate into a cooking unit, the claw including an abutment configured to position the channels of the at least the portion of the plurality of slats at a downward angle with respect to the cooking unit.

20. The food support grate of claim 19, wherein the downward angle is at least 5 degrees below horizontal.

21. The food support grate of claim 13, wherein:
   a first slat of the plurality of slats is shaped as a "J";
   the rear side and the front side of the first slat each have a portion positioned at a first oblique angle with respect to one of the upper and lower planes;
   the first slat is spaced apart from a respective adjacent slat by a first distance so that the channel of the respective adjacent slat is disposed to receive fluid dripping downward from the upper cooking surface of the first slat;
   a second slat of the plurality of slats is shaped as a wedge;
   the rear side and the front side of the second slat each have a portion positioned at a second oblique angle with respect to one of the upper and lower planes;
   the second slat is spaced apart from a respective adjacent slat by a second distance so that the channel of the respective adjacent slat is disposed to receive fluid dripping downward from the upper cooking surface of the second slat; and
   the first distance is different than the second distance and the first oblique angle is different than the second oblique angle.

22. A food support grate, comprising:
   a plurality of slats positioned in a spaced-apart relation to each other, each of the plurality of slats having:
      an upper cooking surface having an upper apex;
      a lower cooking surface having a lower apex;
      a rear side that extends from the upper cooking surface to the lower cooking surface; and
      a front side;
   a plurality of bridges that each couple two or more adjacent slats of the plurality of slats to each other;
   wherein the lower cooking surface of each of at least a portion of the plurality of slats includes a channel along a length of the respective slat of the at least the portion of the plurality of slats, the channel being configured to collect fluid draining down the front side of the respective slat;
   wherein the food support grate further comprises a claw configured to couple the food support grate into a cooking unit, the claw including an abutment configured to position the channels of the at least the portion of the plurality of slats at a downward angle with respect to the cooking unit;
   wherein the food support grate is configured to be positioned in a cooking unit with the upper cooking surfaces facing upward; and
   wherein the food support grate is further configured to be positioned in the cooking unit with the lower cooking surfaces facing upward and the upper cooking surfaces facing downward.

* * * * *